US011485660B1

(12) United States Patent
Qasem et al.

(10) Patent No.: US 11,485,660 B1
(45) Date of Patent: Nov. 1, 2022

(54) SYSTEM AND METHOD FOR DESALINATION

(71) Applicant: KING FAHD UNIVERSITY OF PETROLEUM AND MINERALS, Dhahran (SA)

(72) Inventors: Naef A. A. Qasem, Dhahran (SA); Muhammad M. Generous, Dhahran (SA); Syed Mohammad Zubair, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/724,084

(22) Filed: Apr. 19, 2022

(51) Int. Cl.
*C02F 9/00* (2006.01)
*C02F 1/52* (2006.01)
(Continued)

(52) U.S. Cl.
CPC ............. *C02F 9/00* (2013.01); *B01D 61/025* (2013.01); *B01D 61/422* (2013.01); *B01D 61/58* (2013.01); *C02F 1/004* (2013.01); *C02F 1/4693* (2013.01); *C02F 1/52* (2013.01); *C02F 1/66* (2013.01); *C02F 1/68* (2013.01); *B01D 2311/04* (2013.01); *B01D 2311/08* (2013.01);
(Continued)

(58) Field of Classification Search
None
See application file for complete search history.

(56) References Cited

U.S. PATENT DOCUMENTS

| 4,141,825 A * | 2/1979 | Conger ................. B01D 61/58 204/542 |
| 7,501,064 B2 | 3/2009 | Schmidt et al. |
| 2017/0036171 A1 | 2/2017 | Lienhard et al. |

FOREIGN PATENT DOCUMENTS

| CN | 206278964 U | 6/2017 |
| GB | 2 249 307 A | 5/1992 |
| KR | 10-2015-0094907 A | 8/2015 |

OTHER PUBLICATIONS

Generous et al., An innovative hybridization of electrodialysis with reverse osmosis for brackish water desalination, Aug. 12, 2021, Elsevier, Energy Conversion and Management, 245, pp. 1-12. (Year: 2021).*

(Continued)

*Primary Examiner* — David C Mellon
(74) *Attorney, Agent, or Firm* — Oblon, McClelland, Maier & Neustadt, L.L.P.

(57) ABSTRACT

A method for desalination is provided. An electric potential difference is applied across a saline solution, where a salinity of the saline solution is in a range of 2.5 to 7.8 parts per thousand. The saline solution is separated, using electrodialysis, into a concentrated saline solution and a first diluate. The concentrated saline solution is transferred to a reverse osmosis chamber. The concentrated saline solution is pumped through a partially permeable membrane, thereby removing salt ions from the concentrated saline solution, and creating a second diluate and a brine solution. A pressure of the solution is then increased, using a pressure exchanger, by transferring water pressure from the brine solution to the concentrated saline solution. The first diluate and the second diluate are combined, where a first recovery ratio of the first diluate is greater than a second recovery ratio of the second diluate.

10 Claims, 11 Drawing Sheets

(51) Int. Cl.
*C02F 1/66* (2006.01)
*C02F 1/68* (2006.01)
*B01D 61/42* (2006.01)
*B01D 61/02* (2006.01)
*B01D 61/58* (2006.01)
*C02F 1/469* (2006.01)
*C02F 1/44* (2006.01)
*C02F 1/00* (2006.01)
C02F 103/08 (2006.01)

(52) U.S. Cl.
CPC ......... *B01D 2311/2649* (2013.01); *B01D 2313/243* (2013.01); *B01D 2313/246* (2013.01); *B01D 2317/022* (2013.01); *B01D 2317/04* (2013.01); *B01D 2317/08* (2013.01); *C02F 1/441* (2013.01); *C02F 2001/5218* (2013.01); *C02F 2103/08* (2013.01); *C02F 2201/002* (2013.01); *C02F 2201/46115* (2013.01); *C02F 2209/03* (2013.01); *C02F 2209/05* (2013.01); *C02F 2303/10* (2013.01)

(56) References Cited

OTHER PUBLICATIONS

E.A. Abdel-Aal, et al., "Desalination of Red Sea water using both electrodialysis and reverse osmosis as complementary methods", Egyptian Journal of Petroleum, vol. 24, 2015, pp. 71-75.

Ronan K. McGovern, et al., "A Hybrid Electrodialysis-Reverse Osmosis System Design and Its Optimization for the Treatment of Highly Saline Brines", IDA Journal of Desalination and Water Reuse, Apr. 2014, pp. 1-15.

\* cited by examiner

SYSTEM AND METHOD FOR DESALINATION

STATEMENT REGARDING PRIOR DISCLOSURE BY THE INVENTORS

Aspects of this technology are described in "An innovative hybridization of electrodialysis with reverse osmosis for brackish water desalination," Energy Conversion and Management; 245 (2021); 114589, which is incorporated herein by reference in its entirety.

BACKGROUND

Technical Field

The present disclosure is directed to a system and a method for purification of contaminated liquids, and particularly to a system and a method for desalination of water.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Owing to limited sources of water, need for innovative technologies and alternative water supplies for both drinking water and agriculture has increased in the recent past. One of the known methods for obtaining an alternative source of potable water includes desalination systems capable of producing the potable water. Electrodialysis Desalination (ED) is one of the membrane-based desalination technologies, where an electric potential moves the ions from a diluate cell to a concentrated cell through ion exchange membranes. Such desalination process is also employed for treatment of brackish water which is necessary to obtain adequate supply of drinking water.

Conventionally, a number of systems are utilized for desalination of such water, including combinations of membrane-based technologies, such as pressure-driven reverse osmosis (RO) and electrically-driven electrodialysis (ED). Currently, RO-ED hybrid systems work efficiently than standalone desalination systems. In such hybrid systems, RO first treats saline water and concentrates brine for the production of salt.

U.K. Patent 2249307 describes obtaining desalinated water by using a combination of at least two membrane units, such as electrodialysis (ED) followed by reverse osmosis (RO) including nanofiltration, arranged in a series configuration. Each membrane unit progressively purifies the water until a required degree of purity is ensured. At least part of a waste brine solution of the RO unit is recycled by the electrodialysis unit.

Chinese utility application 206278964 describes an electrodialysis reverse osmosis combination for desalination of seawater.

U.S. Pat. No. 7,501,064 describes an integrated treatment system using electrodialysis and pressure-driven membranes for deionizing and decontaminating liquids to a near-pure quality for use or reuse in industrial or municipal operations.

Korean Application No. 2015094907 describes a desalination apparatus using a metal fiber electrodialysis (MFED) and a reverse osmosis (RO) membrane and a desalination method thereof for removal of ions from contaminated water.

U.S. Patent Publication No. 20170036171 describes a liquid purification system including an electrodialysis system having at least one stack of at least one pair of electrodes, between which is disposed at least one cell pair having an anion exchange membrane (AEM) and a cation exchange membrane (CEM), together configured to produce a purified output stream.

"Desalination of Red Sea water using both electrodialysis and reverse osmosis as complementary methods" by Abdel-Aal et al., Egyptian Journal of Petroleum, Volume 24, Issue 1, March 2015, Pages 71-75 describes usage of electrodialysis and RO units as an integrated system to treat seawater. Further, "Hybrid electrodialysis reverse osmosis system design and the system optimization for treatment of highly saline brines" by McGovern et al, IDA Journal of Desalination and Water Reuse, 26 Mar. 2014, Pages 15-23 discusses a hybrid arrangement of counterflow ED systems with reverse osmosis to concentrate a saline feed at salinity of 120 parts per thousand.

However, none of the references describe systems and methods capable of providing purified product water suitable for drinking, having high product recovery ratios, and/or of low cost to consumers. Accordingly, it is an object of the present disclosure to provide a system and a method to address the above limitations.

SUMMARY

In an exemplary embodiment, a method for desalination is described. The method includes applying an electric potential difference across a saline solution in an electrodialysis cell using a positive anode and a negative cathode, where a salinity of the saline solution is between 2.5 parts per thousand and 7.8 parts per thousand. The method further includes separating, using electrodialysis, the saline solution into a concentrated saline solution and a first diluate. The method further includes transferring the concentrated saline solution to a reverse osmosis (RO) chamber connected to the electrodialysis cell. The RO chamber includes at least one pump and at least one partially permeable membrane. The method further includes pumping, using the at least one pump, the concentrated saline solution through the at least one partially permeable membrane, thereby removing salt ions from the concentrated saline solution and creating a second diluate and a brine solution. The method further includes increasing a pressure of the concentrated saline solution by transferring, using a pressure exchanger, water pressure from the brine solution to the concentrated saline solution. The method further includes combining the first diluate and the second diluate into a product water solution, where a first recovery ratio of the first diluate is greater than a second recovery ratio of the second diluate.

In some embodiments, the method further includes filtering the saline solution with at least one pretreatment filter before applying the electric potential difference.

In some embodiments, the at least one pretreatment filter is one of a sand filter, a cartridge filter, or a chemical filter.

In some embodiments, the electrodialysis cell includes a plurality of cation exchange membranes (CEMs) and a plurality of anion exchange membranes (AEMs).

In some embodiments, the method further includes increasing a pressure of the concentrated saline solution after separation in the electrodialysis cell with at least one high pressure pump.

In some embodiments, the method further includes increasing a pressure of the concentrated saline solution after the pressure exchanger using at least one booster pump.

In some embodiments, the method further includes crystallizing the brine solution, resulting in a salt precipitate and a third diluate, the third diluate having a lower concentration of dissolved salts than the brine solution.

In some embodiments, the method further includes adjusting a mineral content of the product water solution.

In some embodiments, the method further includes filtering the product water solution.

In some embodiments, the method further includes adjusting a pH of the product water solution.

In an exemplary embodiment, a system for desalination is described. The system includes at least one electrodialysis cell including the positive anode and the negative cathode. The system includes at least one RO chamber. The RO chamber includes the at least one pump, the at least one partially permeable membrane, and the at least one pressure exchanger. An outlet of the at least one electrodialysis cell is connected to an input of the at least one RO chamber. The positive anode and the negative cathode create the electric potential difference across the saline solution in the at least one electrodialysis cell. The salinity of the saline solution is between 2.5 parts per thousand and 7.8 parts per thousand. The saline solution is separated into the concentrated saline solution and a first diluate by electrodialysis in the at least one electrodialysis cell. The concentrated saline solution is pumped by the at least one pump through the at least one partially permeable membrane in the RO chamber, thereby removing the salt ions from the concentrated saline solution and creating a second diluate and the brine solution. The pressure exchanger transfers water pressure from the brine solution to the concentrated saline solution. The diluate and the additional diluate are combined into the product water solution. The first of the first diluate is greater than the second recovery ratio of the second diluate.

In some embodiments, the system further includes at least one pretreatment filter. The saline solution is filtered through the at least one pretreatment filter before electrodialysis.

In some embodiments, the at least one pretreatment filter is the sand filter, the cartridge filter, and/or the chemical filter.

In some embodiments, the at least one electrodialysis cell includes the plurality of CEMs and the plurality of AEMs.

In some embodiments, the RO chamber further includes the at least one high pressure pump. The at least one high pressure pump increases the pressure of the concentrated saline solution.

In some embodiments, the RO chamber further includes the at least one booster pump. The at least one booster pump increases the pressure of the concentrated saline solution after the water pressure is transferred to the concentrated saline solution by the at least one pressure exchanger.

In some embodiments, the at least one partially permeable membrane is a spiral wound membrane.

In some embodiments, the system further includes a post-treatment module for adjusting the mineral content of the product water solution.

In some embodiments, the system further includes a post-treatment module for treating the product water solution. The post-treatment module includes at least one filter.

In some embodiments, the system further includes a post-treatment module for adjusting the pH of the product water solution.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
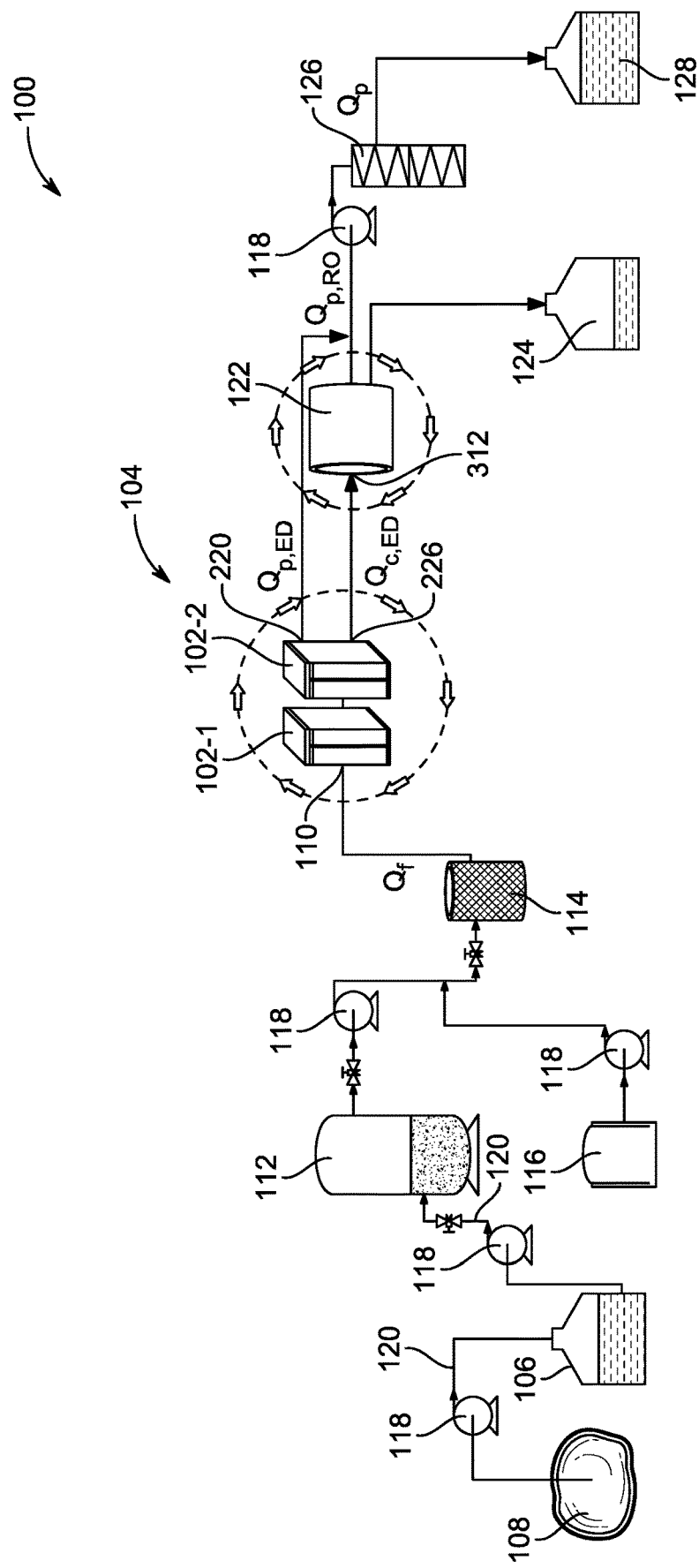
FIG. 1 is a schematic block diagram of a system to perform desalination of water, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present disclosure are directed to a system and a method for desalination of a saline solution. A reverse osmosis (RO) chamber of the system is configured to process a concentrated brine produced by an electrodialysis desalination (ED) unit of the system. Although the description herein is directed to desalination of brackish water, aspects of the present disclosure may be extended to desalination of liquids associated with a salinity more than that of the brackish water.

FIG. 1 illustrates a schematic block diagram of a system 100 that performs desalination of water. The system 100 is alternatively referred to as "the hybrid plant 100". The system 100 includes an electrodialysis cell 104. In the illustrated embodiment, the electrodialysis cell 104 is represented as a stack of electrodialysis cells 102-1 and 102-2. As such, the electrodialysis cell 104 is alternatively referred to as "the stack 104" which constitutes an "ED unit 104". In some embodiments, multiple such electrodialysis cells may be connected in series to constitute a larger stack. The electrodialysis cell 104 includes an inlet 110 configured to receive a saline solution or feed, which is pretreated form of brackish water, from a storage tank 106. The brackish water is pumped into the storage tank 106 from a source 108. A salinity of the saline solution is in a range of 0.1 to 50, preferably 0.5 to 25, 1 to 10, or 2.5 parts per thousand to 7.8 parts per thousand. The source 108 may be one of, but is not limited to, an estuary, a lake, a man-made pool, and a stream. The system 100 includes one or more pretreatment filters. The saline solution is filtered through the pretreatment filters before electrodialysis. In some embodiments, the one or more pretreatment filters includes, but not limited to, a sand filter 112, a cartridge filter 114, and a chemical filter, such as a flocon 116. The sand filter 112 is configured to remove suspended particles, carcinogens, bacteria and protozoa, and undissolved metals such as lead and calcium, from the brackish water. The cartridge filter 114 is configured to remove impurities, pollutants and chemicals from the brackish water. The flocon 116 is configured to add anti-scaling and anti-fouling chemicals to the brackish water. The system 100 also includes a plurality of pumps 118 and a plurality of conduits 120 together configured to maintain a flow of the saline solution or feed ($Q_f$). The system 100 includes a RO chamber 122, a brine tank 124, an air source 126, and a permeate tank 128.

Figure 2:
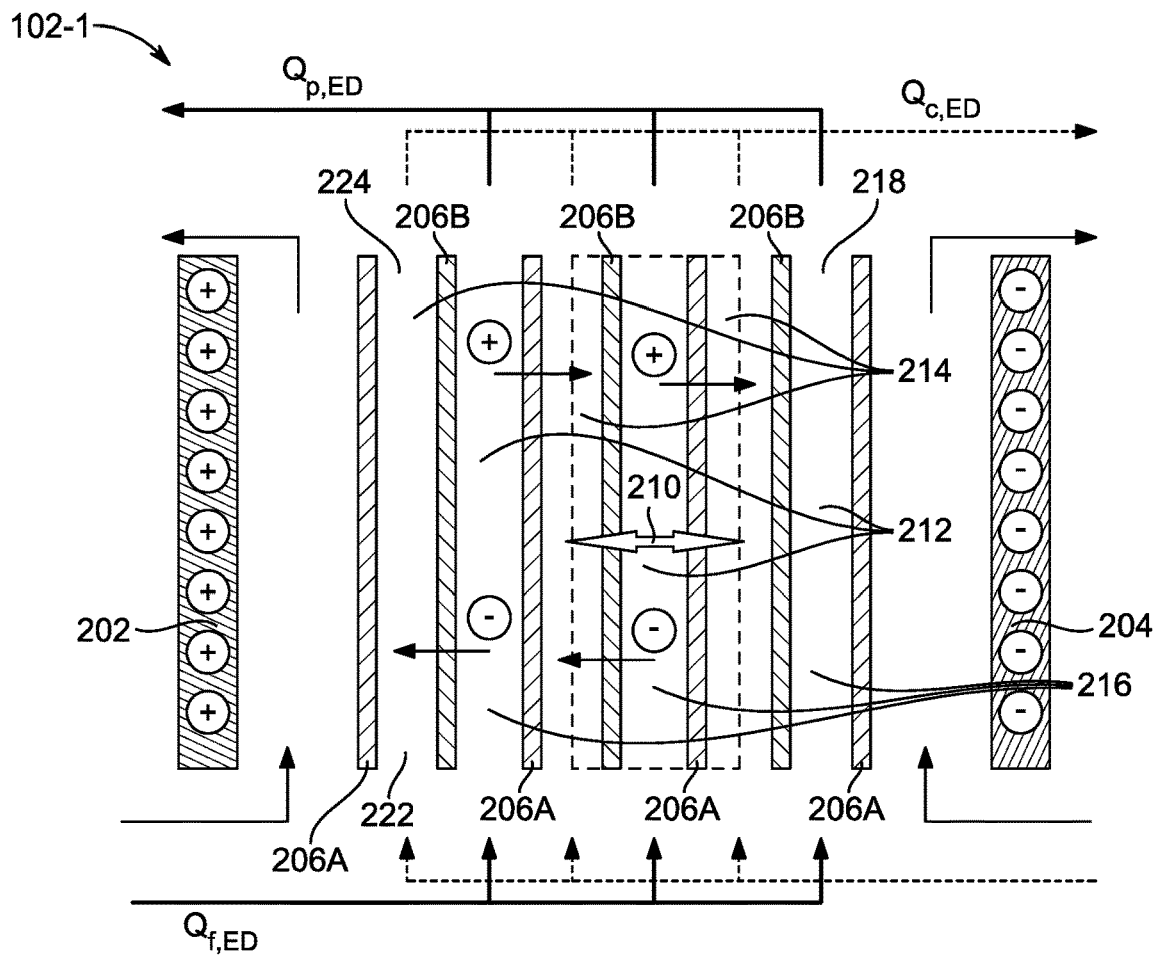
FIG. 2 is an exemplary cross-sectional view of an electrodialysis cell of the system of FIG. 1, according to certain embodiments of the present disclosure.

FIG. 2 illustrates an exemplary cross-sectional view of the electrodialysis cells 102-1. A positive anode 202 and a negative cathode 204 of the electrodialysis cells 102-1 are together configured to create an electric potential difference across the saline solution. In an embodiment, the electrodialysis cells 102-1 further includes a plurality of cation exchange membranes (CEMs) 206A and a plurality of anion exchange membranes (AEMs) 206B which allow the passage of positive ions and negative ions of the saline solution therethrough, respectively. The CEMs 206A and AEMs 206B are collectively referred to as "the ED membrane(s) 206". The electrodialysis cell 102-1 further includes a plurality of cell pairs 210, where each cell pair 210 includes the CEM 206A and the AEM 206B. In some embodiments, 61 CZL 386 and 204 UZL 386 type membrane may be used for the CEM 206A and the AEM 206B, respectively. The electrodialysis cells 102 further includes a plurality of diluate channels 212 and a plurality of concentrate channels 214. Each diluate channel 212 is configured to receive the saline solution via a corresponding inlet 216. $Q_{f,ED}$ is a flow of the feed (saline solution) into the diluate channel 212. By the process of electrodialysis, the saline solution is separated into a concentrated saline solution and a first diluate (also referred to as "the product water"). Further, the plurality of diluate channels 212 is configured to allow flow of the first diluate via a plurality of outlets 218 which together constitutes a first outlet 220 of the electrodialysis cell 102-1. $Q_{c,ED}$ is a flow of the concentrated saline solution and $Q_{p,ED}$ is a flow of the first diluate. The concentrated saline solution includes a higher salinity than the salinity of the saline solution (feed). The plurality of the concentrate channels 214 is configured to receive concentrated saline liquid (also referred to as the feed of the concentrate), via a plurality of inlets 222. The plurality of concentrate channels 214 is configured to allow flow of the concentrated saline solution via a plurality of outlets 224. Further, the plurality of outlets 224 of the concentrate channels 214 together constitutes an outlet 226, also referred to as 'the second outlet 226', of the one or more electrodialysis cells 102 to supply the concentrated saline solution.

In a preferred embodiment, the electrodialysis cells 102-1 and/or 102-2 may include a solid particulate settling tank or be fluidly connected to a solid particulate settling tank disposed immediately downstream of the final electrodialysis cells. The saline solution entering the electrodialysis cells may include significant amounts of small, uncharged, insoluble particles. Electrodialysis is a charge-based process and does not remove neutral, insoluble components. It is therefore preferable to reduce the number of suspended solids in the concentrated saline solution resulting from electrodialysis. In a preferred aspect, the concentrated saline solution $Q_{c,ED}$ may be passed through a settling tank before reverse osmosis. The settling tank may include a cylindrical tank for centripetal flow in order to maintain the pressure of $Q_{c,ED}$. The inlet to the settling tank may be an inlet located at an inlet height within the middle third of the height of the tank. $Q_{c,ED}$ may be passed as an input into the inlet at the inlet height of the settling tank. The inlet may be a tangential inlet arranged such that the input enters the cylindrical tank tangentially and flows circumferentially along the walls of the cylindrical tank. In a preferred embodiment, the input $Q_{c,ED}$ follows a spiral or circular flow within the settling tank. The settling tank may include a first outlet located at an outlet height, wherein the outlet height is within the top 20% of the height of the tank. $Q_{c,ED}$ may leave the settling tank through the first outlet after traversing a spiral or circular path within the settling tank.

In one embodiment, a bottom third of the height of the settling tank may include a series of baffles. The baffles may be arranged perpendicularly to the central axis of the tank, that is, intersecting the walls of the cylindrical settling tank. Each baffle in the series of baffles may include a plurality of holes. Each baffle has a porosity value as a result of the plurality of holes and the size of the holes. In one embodiment, the highest baffle in the settling tank, or the baffle that is furthest from the base of the settling tank, may have a first porosity value. The porosity value of each subsequent baffle may be within a range of +/−10% of the porosity value of the preceding baffle. In one embodiment, the number of holes in each baffle may increase with the proximity of the baffle to the base of the settling tank. Therefore, the lowest baffle in the settling tank may have the most holes compared to the preceding baffles in the series of baffles. Additionally, a dimension of holes in each baffle may decrease with the proximity of the baffle to the base of the settling tank. Therefore, the plurality of holes in the lowest baffle in the settling tank may have the smallest dimension, e.g., a diameter, a circumference, compared to the preceding baffles in the series of baffles. In an example embodiment, the settling tank may include at least 5 baffles. In a preferred example embodiment, the settling tank may include between 5 and 15 baffles. However, the settling tank may also include less than 5 or more than 15 baffles in alternate implementations. In one embodiment, the settling tank may include a second outlet, wherein the second outlet may permit removal of settled materials such as the insoluble solids. The second outlet may be located along the base of the cylindrical settling tank. In one embodiment, the settling tank may include a plurality of outlets for removing settled materials. For example, the settling tank may include outlets and/or pumps at at least one of the baffles to remove settled materials.

The tangential flow of $Q_{c,ED}$ and the arrangement of baffles as described herein may permit removal of small, insoluble suspended solids and sediments in the $Q_{c,ED}$. The arrangement of baffles may distribute the $Q_{c,ED}$ flow to minimize dead zones and improve settling of unwanted sediments. The arrangement of baffles may also decrease turbulence of $Q_{c,ED}$ to improve settling of unwanted sediments. In addition, the arrangement of baffles may achieve settling of unwanted sediments without affecting the pressure of the $Q_{c,ED}$ stream entering the reverse osmosis chamber. Maintaining the pressure of the $Q_{c,ED}$ flow is important for subsequent reverse osmosis steps, as will be described in greater detail below. In one embodiment, an additional pump may be used to increase the pressure of the $Q_{c,ED}$ flow before and/or after the settling tank.

Figure 3:
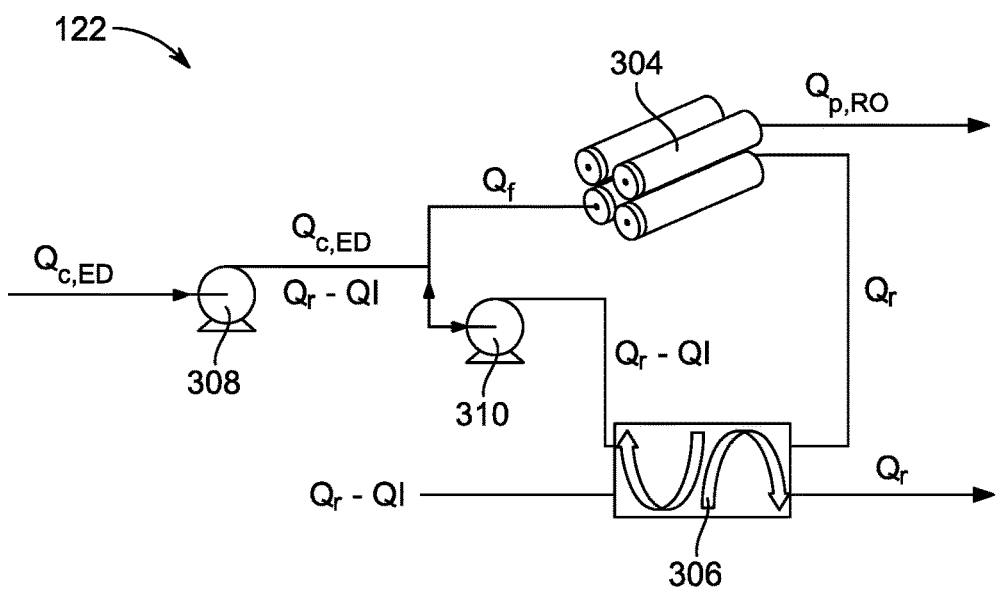
FIG. 3 is an exemplary illustration of a reverse osmosis (RO) chamber assisted by a pressure exchanger of the system of FIG. 1, according to certain embodiments of the present disclosure.

FIG. 3 illustrates an exemplary RO chamber 122 of the system 100, according to an embodiment of the present disclosure. The RO chamber 122 includes at least one pump 308, 310, at least one partially permeable membranes 304 (also referred to as "the RO membranes 304") and a pressure exchangers 306. In an aspect, the RO membrane 304 may be embodied as a spiral wound membrane. In some aspects, the RO membrane 304 may be embodied as one of, but not limited to, a curved, a flat or a planar membrane. The RO chamber 122 further includes a high pressure pump 308 and a booster pump 310.

An input 312 (shown in FIG. 1) of the RO chamber 122 is connected to the outlet 226 of the electrodialysis cell 104. The concentrated saline solution is pumped through the partially permeable membranes 304 in the RO chamber 122. The high pressure pump 308 increases the pressure of the concentrated saline solution. Further, the high-pressure pump 308 and the booster pump 310 counter an osmotic pressure and transfer water against the osmotic pressure. The concentrated saline solution pumped through the partially permeable membranes 304 aids removal of salt ions from the concentrated saline solution and creates a second diluate and a brine solution. $Q_{p,RO}$ is a flow of the second diluate and $Q_r$ is a flow of the brine solution or rejected brine solution. In some embodiments, the pressure exchanger 306 transfers water pressure from the brine solution to the concentrated saline solution. In some embodiments, the booster pump 310 increases the pressure of the concentrated saline solution after the water pressure is transferred to the concentrated saline solution by the pressure exchanger 306. The first diluate and the second diluate are combined into a product water solution, also referred to as the permeate. $Q_{p,tot}$ is a flow of the permeate. According to an aspect, a first recovery ratio of the first diluate is greater than a second recovery ratio of the second diluate. The product water solution is stored in the permeate tank 128 after post-treatments, for example, oxygenation of the product water solution while passing through the air source 126.

In some embodiments, the system 100 further includes a post-treatment module for treating the product water solution, for example adjusting a mineral content of the product water solution. In one aspect, the mineral content of the product water solution may be adjusted by adding minerals such as calcium and magnesium. In one aspect, the mineral content of the product water solution may be adjusted by blending with brackish water or the concentrated saline solution. The post-treatment module includes filters. In some embodiments, the post-treatment module is configured to adjust a pH of the product water solution. Further, the brine solution is stored in the brine tank 124.

Figure 4:
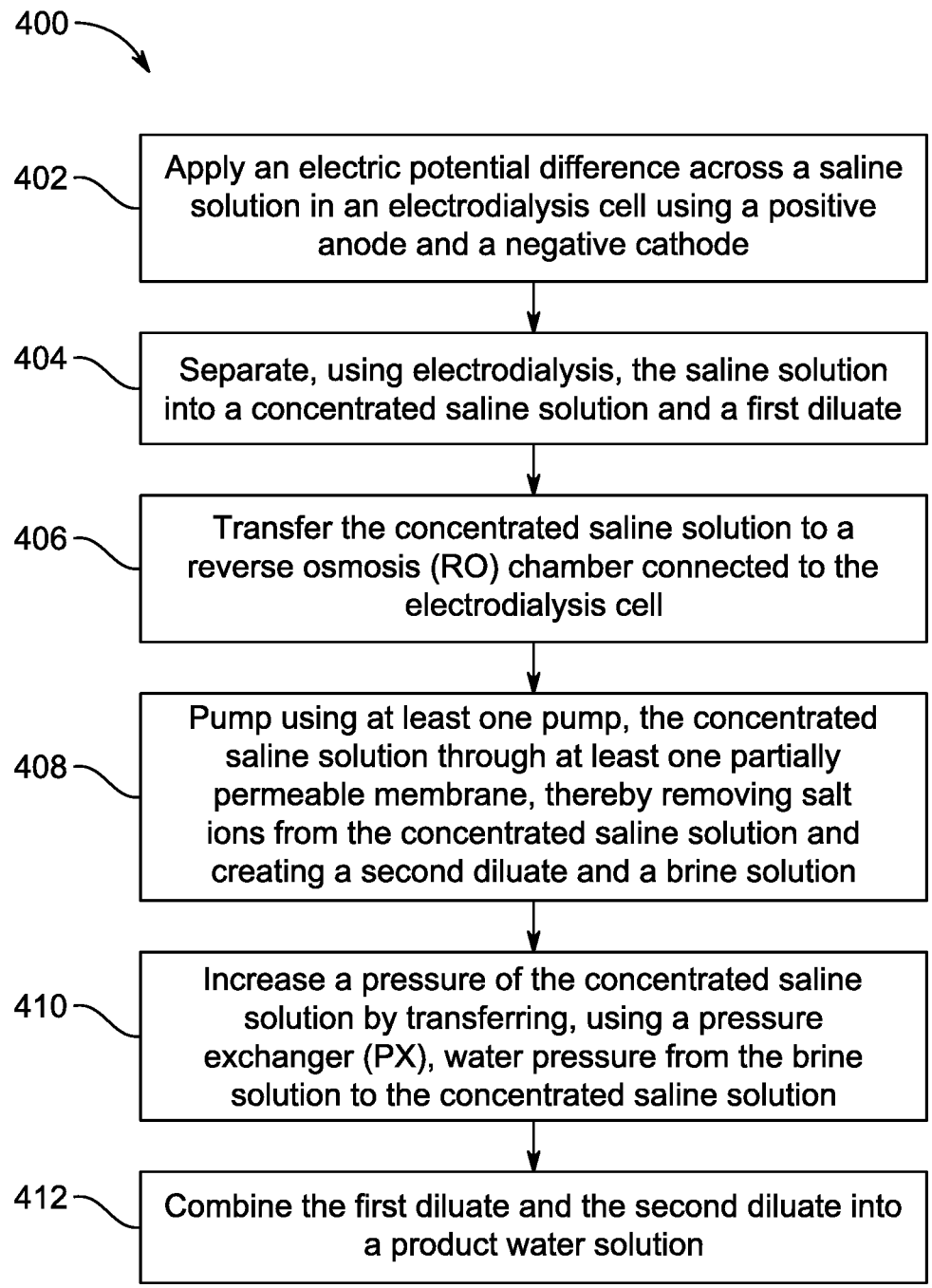
FIG. 4 is a flowchart of a method for desalination of water, according to certain embodiments of the present disclosure.

FIG. 4 illustrates a flow chart of a method 400 for desalination of water. The method 400 is described with reference to the system 100. The order in which the method 400 is described is not intended to be construed as a limitation, and any number of the described method steps can be combined in any order to implement the method 400. Additionally, individual steps may be removed or skipped from the method 400 without departing from scope of the present disclosure.

At step 402, the method 400 includes applying the electric potential difference across the saline solution in the electrodialysis cell 104 using the positive anode 202 and the negative cathode 204. In some embodiments, the electrodialysis cell 104 includes the plurality of CEMs 206A and the plurality of AEMs 206B. The salinity of the saline solution is between 2.5 parts per thousand and 7.8 parts per thousand. In some embodiments, the method 400 further includes filtering the saline solution with the pretreatment filters before applying the electric potential difference. In some embodiments, the pretreatment filters is one of the sand filter 112, the cartridge filter 114, or the chemical filter such as the flocon 116.

At step 404, the method 400 includes separating, using electrodialysis, the saline solution into the concentrated saline solution and the first diluate.

At step 406, the method 400 further includes transferring the concentrated saline solution to the RO chamber 122 connected to the electrodialysis cell 104. The RO chamber 122 includes the pumps and the partially permeable membranes 304.

At step 408, the method 400 further includes pumping, using the pumps, the concentrated saline solution through the partially permeable membranes 304, thereby removing the salt ions from the concentrated saline solution and creating the second diluate and the brine solution. In some embodiments, the method 400 further includes crystallizing the brine solution, resulting in a salt precipitate and a third diluate. The third diluate includes a lower concentration of dissolved salts than the brine solution.

At step 410, the method 400 further includes increasing a pressure of the concentrated saline solution by transferring, using the pressure exchanger 306, water pressure from the brine solution to the concentrated saline solution. In some embodiments, the method 400 further includes increasing the pressure of the concentrated saline solution after separation in the electrodialysis cell 102 with the high pressure pump 308. In some embodiments, the method 400 further includes increasing the pressure of the concentrated saline solution after separation in the electrodialysis cell 102 with the booster pump 310.

At step 412, the method 400 further includes combining the first diluate and the second diluate into the product water solution. The first recovery ratio of the first diluate is greater than the second recovery ratio of the second diluate. In some embodiments, the method 400 further includes adjusting a mineral content of the product water solution. In some embodiments, the method 400 further includes filtering the product water solution. In some embodiments, the method 400 further includes adjusting the pH of the product water solution.

Examples

The following examples describe and demonstrate exemplary embodiments of the system 100 and method 400 described herein. The examples are provided solely for the purpose of illustration and are not to be construed as limitations of the present disclosure, as many variations thereof are possible without departing from the spirit and scope of the present disclosure.

Various models are available for design calculations of the ED unit 104, for example Qasem et al. [See: Qasem NAA, Zubair SM, Qureshi BA, Generous MM. The impact of thermodynamic potentials on the design of electrodialysis desalination plants. Energy Convers Manage 2020; 205: 112448, incorporated herein by reference in its entirety]. The models consider phenomena such as Donnan potential, water transport, spacer effect, and boundary layers. A single membrane area can calculate an active membrane area required for the electrodialysis cell 104. Particularly, the active membrane area can be calculated using equation (1).

$$A = \frac{\left[\ln\left(\frac{\left(2-R_{ED}\right)\frac{C_{s,c}}{C_{s,fc}}\right)^2}{\left(R(2-R_{ED})\frac{C_{s,c}C_{s,d}}{C_{s,fc}C_{s,fd}}\right)^{R_{ED}}}\right) + \frac{\Lambda(r_{BL}+r_m+r_{don})}{\Delta - 2\delta}C_s^{\Delta}\right]}{\left[\frac{C_{s,d}}{C_{s,c}} + 1 + \frac{\Lambda(r_{BL}+r_m+r_{don})}{\Delta - 2\delta}C_{s,d}\right]} \frac{zFw\Delta u\varepsilon C_{s,d}}{\eta_f \beta i} \quad (1)$$

where A is the area of the ED membrane(s) 206 in square meters (m²), $R_{ED}$ is the recovery ration of ED, $C_s^{\Delta}$ a is the degree of salinity in parts per thousand, $r_{BL}$ is the boundary layer resistance in ohm square meters (Ω·m²), $r_m$ is the membrane resistance in Ω·m², $r_{don}$ is the Donnan resistance in Ω·m², Δ is the thickness of the cell in m, δ is the thickness of the boundary layer in m, Λ is the conductivity in Siemens square meter per kilomoles S·m²·kmol⁻¹, z is the valency, F is the Faraday constant, 96485.33 ampere seconds per mole (A·s·mol⁻¹), u is the linear flow velocity in m·s⁻¹, ε is the volume fraction, $\eta_f$ is the current/Faradic efficiency, βi is the shading factor, $C_s$, $C_d$, $C_c$, $C_{fc}$, $C_{fd}$ are the concentrations of the saline solution, diluate, concentrate, feed to the concentrate channel 214 and feed to the diluate channel 212, respectively. $C_{s,f,d}$, $C_{s,d}$, $C_{s,fc}$ and $C_{s,c}$ are the salinities, at the inlets 216 and outlets 218 of the diluate channels 212, and the inlets 222 and outlets 224 of concentrate channels 214, respectively. Net area of the ED membrane(s) 206, calculated from the number of the cell pairs 210 (Nep) and the size of the CEM 206A and AEM 206B is given by equation (2).

$$A_{ED} = 2 \times (N_{cp}A) \quad (2)$$

Energy consumption calculation is considered essential for an assessment of performance of the system 100. Thus, energy required for salt transport ($P_s$) is obtained by multiplication of the applied electric potential (U) and current of the electrodialysis cell 102 ($I_{st}$), provided by equation (3).

$$P_s = UI_{st} = \frac{(zFQ_f)^2 C_s^{\Delta}(\Delta - 2\delta)}{N_{cp}A\eta_f^2 \Lambda}\left[\ln\left(\frac{\left((2-R_{ED})\frac{C_{s,c}}{C_{s,fc}}\right)^2}{\left(R_{ED}(2-R_{ED})\frac{C_{s,c}C_{s,d}}{C_{s,f}C_{s,fd}}\right)^R}\right) + \frac{\Lambda(r_{BL}+r_m+r_{don})}{\Delta - 2\delta}C_s^{\Delta}\right] \quad (3)$$

where, $Q_f$ is the flow rate of the feed or saline solution in cubic meter per second (m³s⁻¹).

Specific energy consumption (SEC) in kilowatt-hour per cubic meter (kWh/m³) required for the salt transport is obtained by dividing power consumption for the salt transport ($P_s$) with the product water obtained from the ED unit 104 or concentrate stream of the system 100, as provided by equation (4).

$$SEC_s = \frac{P_s}{Q_{p,ED}} \quad (4)$$

The SEC for the diluate stream and the concentrate stream through the stack 102 ($SEC_{p,ED}$), is provided by equation (5).

$$SEC_{p,ED} = \frac{27.2\Delta P}{\eta_P \times 10^3} \times \frac{Q_{p,ED} + Q_{c,ED}}{Q_{p,ED}} \quad (5)$$

where, $\eta_P$ is the pump efficiency.

The total $SEC_{ED}$ of the system 100 is provided by equation (6)

$$SEC_{ED} = SEC_s + SEC_{p,ED} \quad (6)$$

where, $SEC_s$ is for the salt transport and $SEC_{p,ED}$ is for pumping to circulate the product water obtained from the ED unit 104. Variables used for calculating the SEC and total membrane area; are shown in Table 1.

TABLE 1

Parameters for the ED unit 104 of the system 100

| Parameters | Symbols | Values |
|---|---|---|
| Permeate salinity | $C_{s,d}$ | 0.2 ppt |
| Feedwater concentration | $C_{s,fd}$ | 2-50 ppt |
| Faraday constant | F | 9.65 × 10⁴ A · s/mol |
| Membrane resistance | $r_m$ | 1.3 × 10⁻³ Ω · m² |
| Safety factor | s | 0.7 |
| Area shading factor | α | 0.712 |

TABLE 1-continued

Parameters for the ED unit 104 of the system 100

| Parameters | Symbols | Values |
|---|---|---|
| Current/Faradic efficiency | $\eta_I$ | 0.9 |
| Plant capacity | $Q_{P,ED}$ | 20,000 m³/day |
| Recovery ratio | $R_{ED}$ | 0.75 |
| Volume fraction | $\varepsilon$ | 0.836 |
| Pump efficiency | $\eta_p$ | 0.84 |
| Cell width | w | 0.42 m |
| Stack length | $L_{st}$ | 0.725 m |
| AEM concentration (wet) | $C_{m,AEM}$ | 1827 mol/m³ |
| CEM concentration (wet) | $C_{m,CEM}$ | 1690 mol/m³ |
| Activity coefficient for AEM | $\gamma\pm$, AEM | $0.56 + 0.00029\ C_s$ |
| Activity coefficient for CEM | $\gamma\pm$, CEM | $0.57 + 0.00028\ C_s$ |
| Linear flow velocity | u | 100 mm/s |

The model uses safety factor(s) to maintain current density below the limiting value. In the present state, no more salt ions are available for the flow of current.

An assessment of the RO membrane area and the SEC for the RO chamber 122 ($SEC_{RO}$) of the system 100 is required for performance estimation, a high-pressure stream to counter the osmotic pressure and losses during the transfer of water molecules to the permeate. Modeling equations for the RO chamber 122 of the system 100 are shown in Table 2. Effect of diffusion and concentration polarization (CP) is considered while modeling the RO chamber 122. Furthermore, a boundary layer effect is considered from a film theory model.

TABLE 2

Modeling equations for the RO chamber

| Meaning | Equation | Eq. No. |
|---|---|---|
| Osmotic pressure | $\pi_{s,i} = \dfrac{3.85 C_{s,i} T}{14.5(1000 - C_{s,i}/1000)}$ | 7 |
| Average transmembrane osmotic pressure | $\Delta\pi_i = 0.5(\pi_{f,i} + \pi_{r,i}) - \pi_{p,i}$ | 8 |
| Pressure difference | $\Delta P_i = \dfrac{(P_{f,i} + P_{r,i})}{2} - P_{p,i}$ | 9 |
| Net driving pressure | $NDP_i = \Delta P_i - \Delta\pi_i$ | 10 |
| Permeate flux | $J_{p,i} = A_{m,RO,i}\phi_w + (\Delta P_i - \Delta\pi_i)$ | 11 |
| Water permeability coefficient | $\phi_w = \dfrac{C_{wm} D_w M_w}{\delta_m R T}$ | 12 |
| Permeator area (single) | $A_{m,RO,i} = \dfrac{J_{p,i}}{\phi_w(\Delta P_i - \Delta\pi_i)}$ | 13 |
| Recovery ratio | $R_{RO} = \dfrac{Q_{p,RO}}{Q_{c,ED}} = \dfrac{\sum_{i=1}^{n} J_{p,i}}{Q_{c,ED}}$ | 14 |
| Solute transport coefficient | $\phi_s = \dfrac{D_s S_s}{\delta_m}$ | 15 |
| Permeate salinity | $C_{p,i} = \dfrac{C_{m,i}}{\dfrac{\phi_w}{\phi_s}(\Delta P_i - \Delta\pi_i) + 1}$ | 16 |
| Salt flux | $J_{s,i} = \phi_s(C_{m,i} - C_{p,i})$ | 17 |
| Leakage ratio | $\beta_l = \dfrac{Q_l}{Q_r}$ | 18 |
| Pressure exchanger efficiency | $\eta_{PX} = \dfrac{P_e}{P_r}$ | 19 |

The osmotic pressure ($\pi_{s,i}$) depends upon the concentration of the salt in the water ($C_{s,i}$) and temperature (T) in K. Osmotic pressures (in kPa) are calculated based on the concentration (in parts per million (ppm)) on surface of a membrane element ($C_{s,i}$). In some embodiments, BW30-400 membrane having an area of 37 m² per permeate may be used. Concentration on the membrane surface is estimated using the film theory model. Equation (7) is also used for calculating the osmotic pressure for the permeate ($\pi_{p,i}$), where the surface concentration term is replaced with the permeate concentration. The feed pressure ($P_{f,i}$), brine pressure ($P_{r,i}$) and permeate pressure ($P_{p,i}$) are used to calculate the Net Driving Pressure (NDP) for a membrane segment. The NDP is used to calculate permeate flux ($J_{p,i}$) and the membrane element area. The $SEC_{RO}$ of the system 100 can be obtained with energy recovery using the pressure exchanger 306. In an aspect, a value of the pressure exchanger efficiency may be 98%. The booster pump 310 elevates the brine solution pressure up to the feed pressure, as shown in FIG. 1. The SEC for a single-stage configuration with the pressure exchanger 306 is provided by equation (20).

$$SEC_{RO} = \frac{\pi_f(R + \beta_l(1 - R_{RO}))S_r}{3600 R(1 - R_{RO} S_r)\eta_{HP}} + \frac{\pi_f(1 - \eta_{PX})(1 - \beta_l)(1 - R_{RO})S_r}{3600 R(1 - R_{RO} S_r)\eta_{BP}} \quad (20)$$

where, $\pi_f$ is the osmotic pressure of the feed, $S_r$ is the salt rejection in percentage (%), $\eta_{HP}$ is the high-pressure pump efficiency, $\eta_{BP}$ is the booster pump efficiency, $R_{RO}$ is the recovery ratio of the RO chamber 122, and $\beta_l$ is the leakage ratio. The SEC for the system 100 is provided by equation (21).

$$SEC_{tot} = \frac{Q_{p,ED} SEC_{ED} + Q_{p,RO} SEC_{RO}}{Q_{p,tot}} \quad (21)$$

The input parameters of the RO chamber 122 of the system 100 is provided in Table 3.

TABLE 3

Input parameters for the RO chamber

| Parameters | Symbols | Values |
|---|---|---|
| Permeate salinity | $C_p$ | 0.2 ppt |
| Temperature | T | 25° C. |
| Booster pump efficiency | $\eta_{BP}$ | 84% |
| HP pump efficiency | $\eta_{HP}$ | 84% |
| Pressure exchanger efficiency | $\eta_{PX}$ | 98% |
| Recovery ratio | $R_{RO}$ | 50% |
| Membrane Replacement Factor | MRF | 10% |
| Feed pressure | $P_f$ | 6400 kPa |

TABLE 3-continued

Input parameters for the RO chamber

| Parameters | Symbols | Values |
|---|---|---|
| Permeate pressure | $P_p$ | 150 kPa |
| Dead pressure | $P_o$ | 101.325 kPa |
| Water permeability coefficient | $\phi_w$ | $2.05 \times 10^{-6}$ m³/(m² · s · kPa) |
| Salt permeability coefficient | $\phi_s$ | $2.03 \times 10^{-5}$ m³/(m² · s) |
| Leakage ratio | $\beta_l$ | 4% |

In one aspect, sensitivity analysis is considered to quantify the effect of input variables on response variables. The sensitivity analysis includes calculation of Relative Contribution (RC) of the input variables towards a specific output variable for the system 100. Perturbation in the response variable (for example, variation of product water cost) is obtained by setting a relative uncertainty value of ±10%. Hereinafter, the RC refers to a comparative influence of an input variable towards determining an output parameter of interest. The RC allows identification of influential parameters in a model. Modeling equations for conducting the sensitivity analysis are shown in Table 4.

TABLE 4

Equations for the sensitivity analysis model

| Meaning | Equation | Eq. No. |
|---|---|---|
| Input variable | $X = \bar{X} \pm \hat{U}_X$ | 22 |
| Perturbation in the response variable | $\hat{U}_Y = \left[\sum_{i=1}^{i=n}\left(\dfrac{dY}{dX_i}\hat{U}_{Xi}\right)^2\right]^{\frac{1}{2}}$ | 23 |
| Relative contribution | $RC = \dfrac{\left(\dfrac{dY}{dX}\hat{U}_{Xi}\right)^2}{\hat{U}_Y^2}$ | 24 |

In Table 4, X is the independent parameter, $\hat{U}$ is the uncertainty and Y is the response parameter.

The RC of the feed salinity at the inlet of the stack 102 ($C_{s,fd}$), current efficiency ($\eta_I$), recovery ratio of the ED unit 104 ($R_{ED}$), average flow velocity (u), the feed salinity at the inlet of the concentrate channel 214 ($C_{s,fc}$), safety factor (s), volume fraction ($\varepsilon$), feed flow rate at the inlet of the stack 102 ($Q_{f,ED}$), product water salinity ($C_{s,d}$), cell thickness ($\Delta$), the thickness of the CEM 206A ($t_{CEM}$), the thickness of the AEM 206B ($t_{AEM}$), the recovery ratio of the RO ($R_{RO}$), the efficiency of the pressure exchanger 306 ($\eta_{PX}$), the efficiency of the pumps of the RO ($\eta_{PX,RO}$), average pressure ($\Delta P$), and the leakage ratio ($\beta_l$) are estimated towards the membrane area of the ED unit 104 and the RO chamber 122 ($A_{m,ED}$) and ($A_{m,RO}$). Model outputs in terms of feed salinity at the inlet of the RO chamber 122 ($C_{s,c}$, concentrated saline solution product of stacks 102), ED and RO membrane areas, total SEC, and water production are shown in Table 5.

TABLE 5

RC of input variables towards the membrane areas, specific energy consumption, and water production using ±10% perturbation in the input variables.

| Conditions for input variables | | | ED area (m²) membrane | RO membrane area (m²) | RO feed salinity (ppm) | Total energy consumption (kWh/m³) | Total water production (m³/day) |
|---|---|---|---|---|---|---|---|
| Input variable | Symbol | Initial value + Perturbation | $A_m$,ED 29102 ± 8411 | $A_{m,RO}$ 85.78 ± 56.45 | Cs,c 7865 ± 726.1 | $SEC_{tot}$ 0.6516 ± 0.1173 | $Q_{p,tot}$ 23333 ± 2560 |
| Diluate feed salinity (ppm) | $c_{s,fd}$ | 5000 ± 500 | 6.36% | 0.02% | 30.11% | 25.05% | 0.00% |
| Current efficiency (%) | $\eta_I$ | 90 ± 9 | 12.22% | 0.00% | 0.00% | 28.60% | 0.00% |
| Recovery ratio, ED (%) | $R_{ED}$ | 75 ± 7.5 | 21.21% | 80.48% | 39.76% | 4.75% | 15.25% |
| Average flow velocity (m/s) | u | 0.1 ± 0.01 | 5.07% | 0.00% | 0.00% | 12.21% | 0.00% |
| Concentrate feed salinity (ppm) | $C_{s,fc}$ | 5000 ± 500 | 0.18% | 0.02% | 30.11% | 0.33% | 0.00% |
| Safety factor (—) | s | 0.7 ± 0.07 | 18.09% | 0.00% | 0.00% | 11.29% | 0.00% |
| Volume fraction (—) | $\varepsilon$ | 0.8355 ± 0.08355 | 20.19% | 0.00% | 0.00% | 14.74% | 0.00% |
| Feed flow rate, ED (m³/day) | $Q_{f,ED}$ | 26666 ± 2667 | 11.97% | 9.23% | 0.00% | 0.00% | 83.05% |
| Product salinity (ppm) | $C_{s,d}$ | 200 ± 20 | 4.20% | 0.00% | 0.03% | 0.04% | 0.00% |
| Cell thickness (mm) | $\Delta$ | 0.18 ± 0.018 | 0.09% | 0.00% | 0.00% | 2.09% | 0.00% |
| Pump efficiency, ED (%) | $\eta_{P,ED}$ | 84 ± 8.4 | 0.00% | 0.00% | 0.00% | 0.40% | 0.00% |
| Membrane thickness, AEM (mm) | $t_{AEM}$ | 0.17 ± 0.017 | 0.21% | 0.00% | 0.00% | 0.15% | 0.00% |
| Membrane thickness, CEM (mm) | $t_{CEM}$ | 0.18 ± 0.018 | 0.21% | 0.00% | 0.00% | 0.15% | 0.00% |
| Recovery ratio, RO (%) | $t_{RO}$ | 50 ± 5 | 0.00% | 2.70% | 0.00% | 0.01% | 1.69% |
| Pressure exchanger efficiency (%) | $\eta_{PX}$ | 90 ± 9 | 0.00% | 0.00% | 0.00% | 0.14% | 0.00% |
| Pump efficiency, RO (%) | $\eta_{P,RO}$ | 84 ± 8.4 | 0.00% | 0.00% | 0.00% | 0.06% | 0.00% |
| Pressure difference (bar) | $\Delta_P$ | 6150 ± 615 | 0.00% | 2.92% | 0.00% | 0.00% | 0.00% |
| Leakage ratio (%) | $\beta_l$ | 4 ± 0.4 | 0.00% | 0.00% | 0.00% | 0.00% | 0.00% |

Table 5 shows that some input parameters significantly influence one or more performance indices while the others have no substantial effect. The parameters such as ED feed salinity, ED recovery ratio ($R_{ED}$), ED current efficiency ($\eta_I$), ED safety factor (s), average flow velocity (u), and volume fraction ($\varepsilon$) were studied for the determination of the SEC. The current efficiency is the most influential parameter (RC=28.60%) for the determination of SEC of the hybrid plant 100. The feed flow rate had a significant impact on the product water solution production rate.

Figure 5:
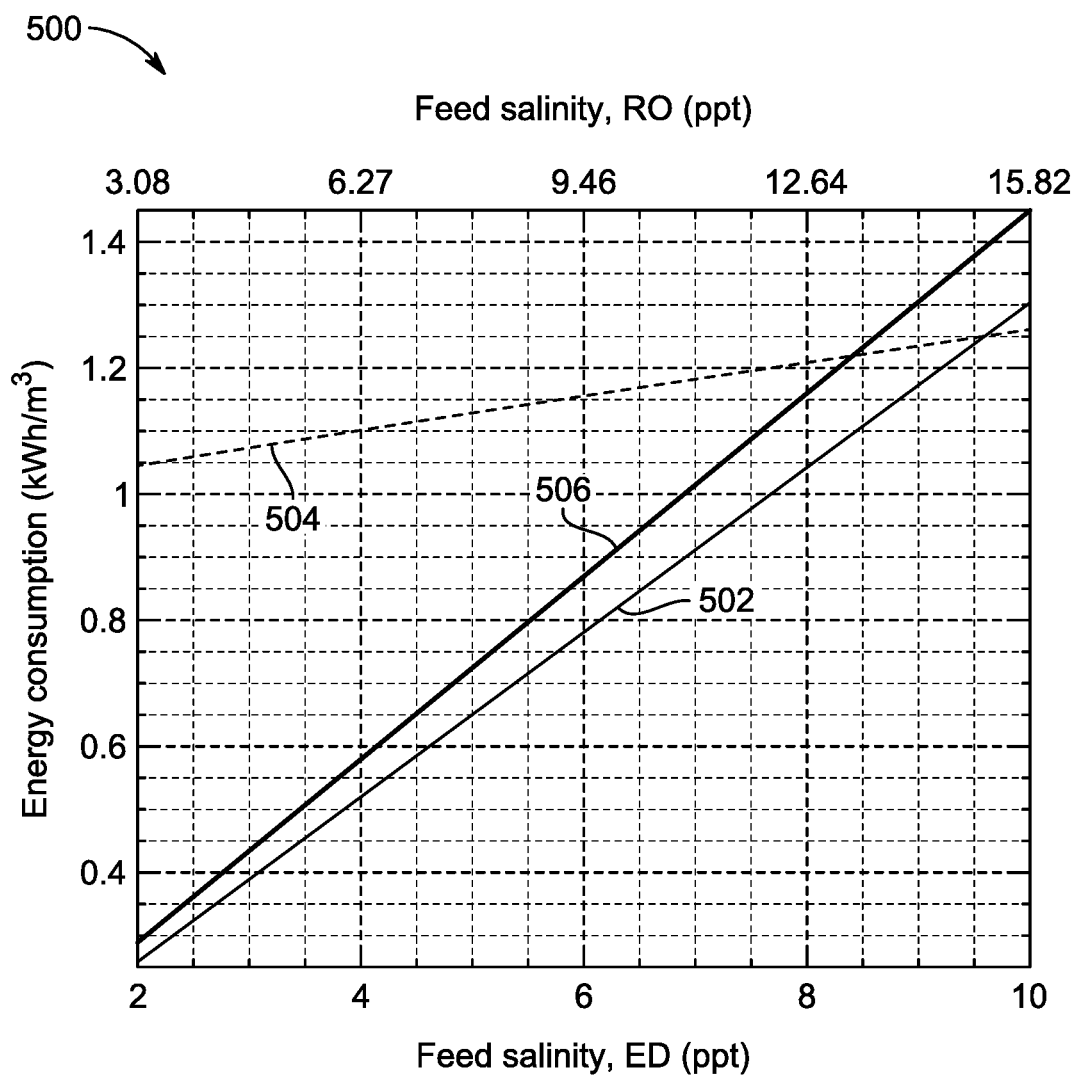
FIG. 5 is a graphical representation of comparison of specific energy consumption (SEC) of the system with standalone electrodialysis desalination (ED) and RO plants, according to certain embodiments of the present disclosure.

FIG. 5 illustrates a graphical representation of SEC of the system 100 against standalone ED and RO plants. The standalone ED and RO plants refer to the ED and RO plants working individually as a complete unit. A graph 500 includes a first line 502 representing the hybrid plant 100, a second line 504 representing the standalone RO plant, and a third line 506 representing the standalone ED plant. A permeate volume of 23,333 m$^3$/day with 0.2 parts per thousand salinity was considered. For a feed salinity of 5 parts per thousand, the first, second and third lines 502, 504, 506 represent SEC$_s$ of 0.6516 kWh/m$^3$, 1.131 kWh/m$^3$, 0.7254 kWh/m$^3$, respectively. The graph 500 shows that the hybrid plant 100 is the most energy-efficient up to the feed salinity of 9.5 parts per thousand, while the standalone RO plant is the least energy-intensive for the feed salinity of >9.5 parts per thousand. Further, at a feed salinity of 10 per thousand, the first, second and third trend lines 502, 504, 506 represent SEC$_s$ of 1.307 kWh/m$^3$, 1.266 kWh/m$^3$ and 1.455 kWh/m$^3$, respectively. Since the salinity of ground water is less than 10 parts per thousand, hybrid ED-RO unit was determined to suit well for energy-saving purposes.

Figure 6:
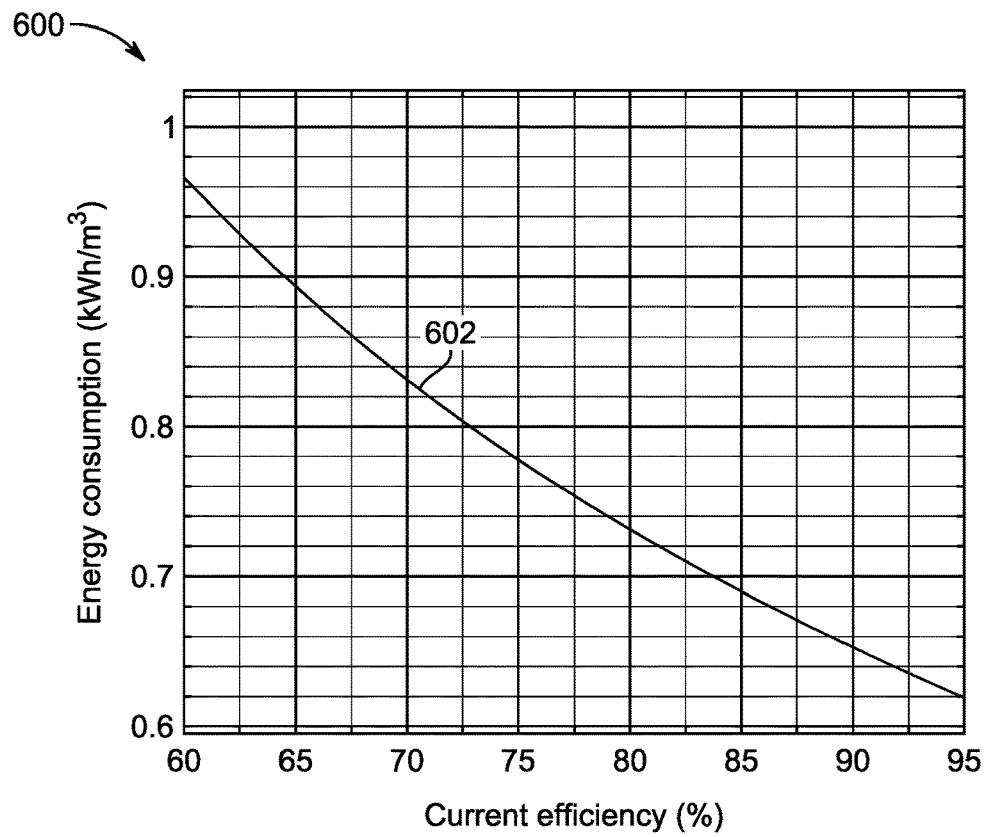
FIG. 6 is a graphical representation of the SEC of the system as a function of ED current efficiency, according to certain embodiments of the present disclosure.

FIG. 6 illustrates a graphical representation of the SEC of the hybrid plant 100 as a function of the current efficiency ($\eta_I$). A graph 600 includes a plot 602 referring to the hybrid plant 100. The plot 602 shows that an increase in the ED current efficiency ($\eta_I$) from 60% to 90% results in a drop in the SEC from 0.9656 to 0.6186 kWh/m$^3$, respectively. Such improvement in the SEC is due to enhanced current passage which leads to enhancement of the salt transport.

Figure 7:
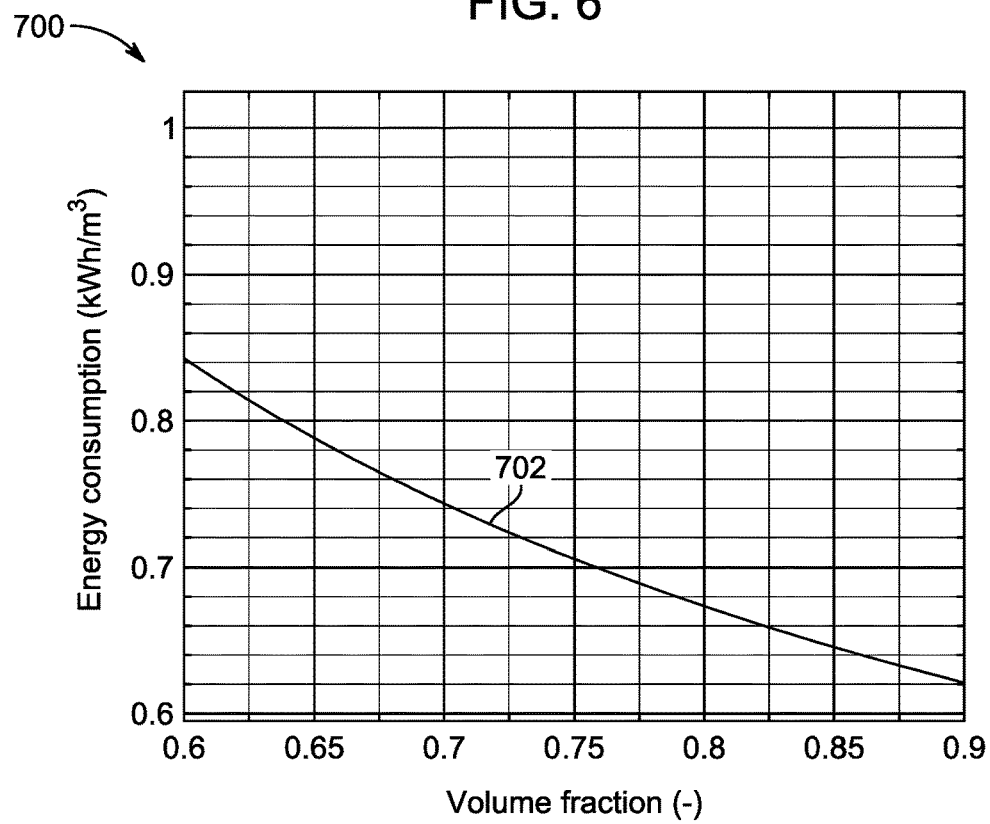
FIG. 7 is a graphical representation of the SEC of the system as a function of an ED volume fraction, according to certain embodiments of the present disclosure.

FIG. 7 illustrates a graphical representation of the SEC of the hybrid plant 100 as a function of the ED volume fraction ($\varepsilon$). A graph 700 includes a plot 702 referring to the hybrid plant 100. The plot 702 shows that an increase in the ED volume fraction ($\varepsilon$) from 0.6 to 0.9, results in a drop in the SEC from 0.84 to 0.62 kWh/m$^3$, respectively. Such energy saving is due to an increased amount of the saline solution treated between the ED membrane 206 which leads to increase in the volume fraction ($\varepsilon$). However, the volume fraction ($\varepsilon$) depends on a porosity of a spacer.

Figure 8:
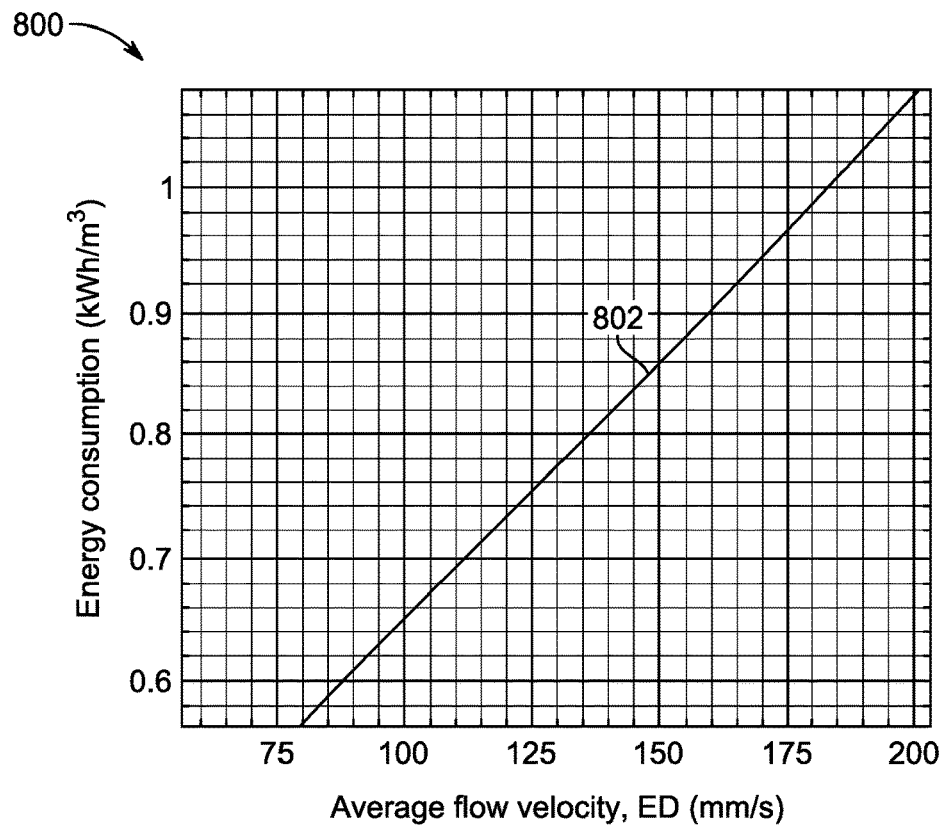
FIG. 8 is a graphical representation of the SEC of the system as a function of an ED average flow velocity, according to certain embodiments of the present disclosure.

FIG. 8 illustrates a graphical representation of the SEC of the hybrid plant 100 as a function of the ED average flow velocity (u). A graph 800 includes a plot 802 that represents the hybrid plant 100. The plot 802 shows that an increase in the average flow velocity (u) from 80 to 200 mm/s, results in an increase in the SEC from 0.569 to 1.074 kWh/m$^3$, respectively, since additional velocity of the concentrated saline solution may minimize the residual time of separation.

Figure 9:
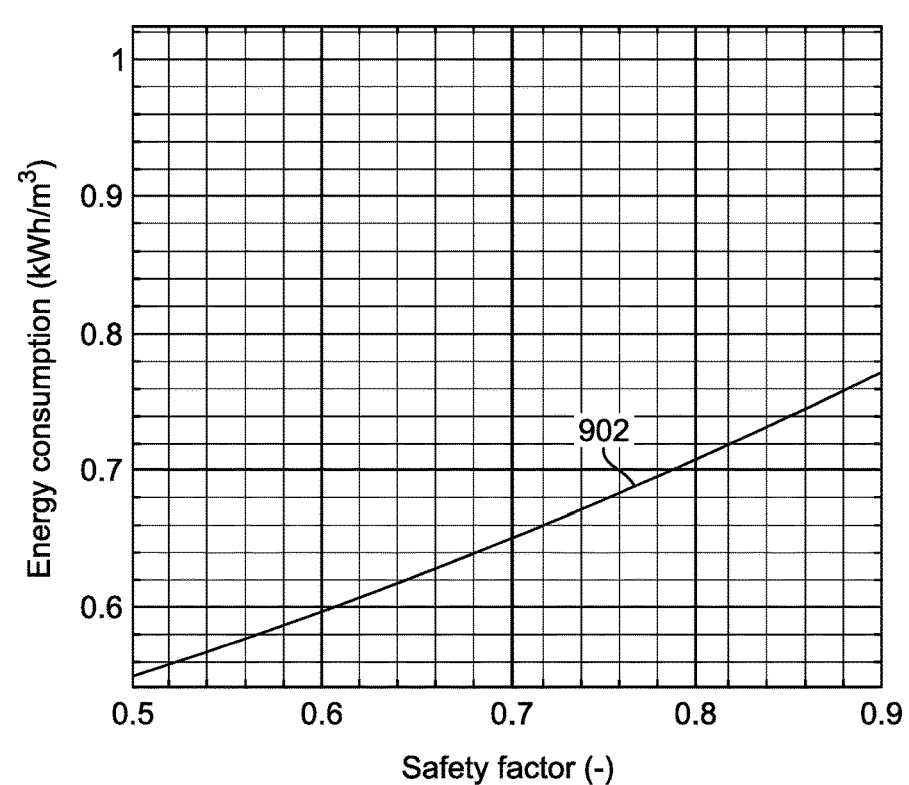
FIG. 9 is a graphical representation of the SEC of the system as a function of an ED safety factor, according to certain embodiments of the present disclosure.

FIG. 9 illustrates a graphical representation of the SEC of the hybrid plant 100 as a function of the ED safety factor (s). A graph 900 includes a plot 902 that represents the hybrid plant 100. The plot 902 shows that an increase in the ED safety factor (s) from 0.5 to 0.9, results in an increase in the SEC from 0.55 to 0.7708 kWh/m$^3$, respectively. The ED unit 104 works at conditions closer to the current density, which consumes more electric energy to separate the salt between the ED membranes 206.

Figure 10:
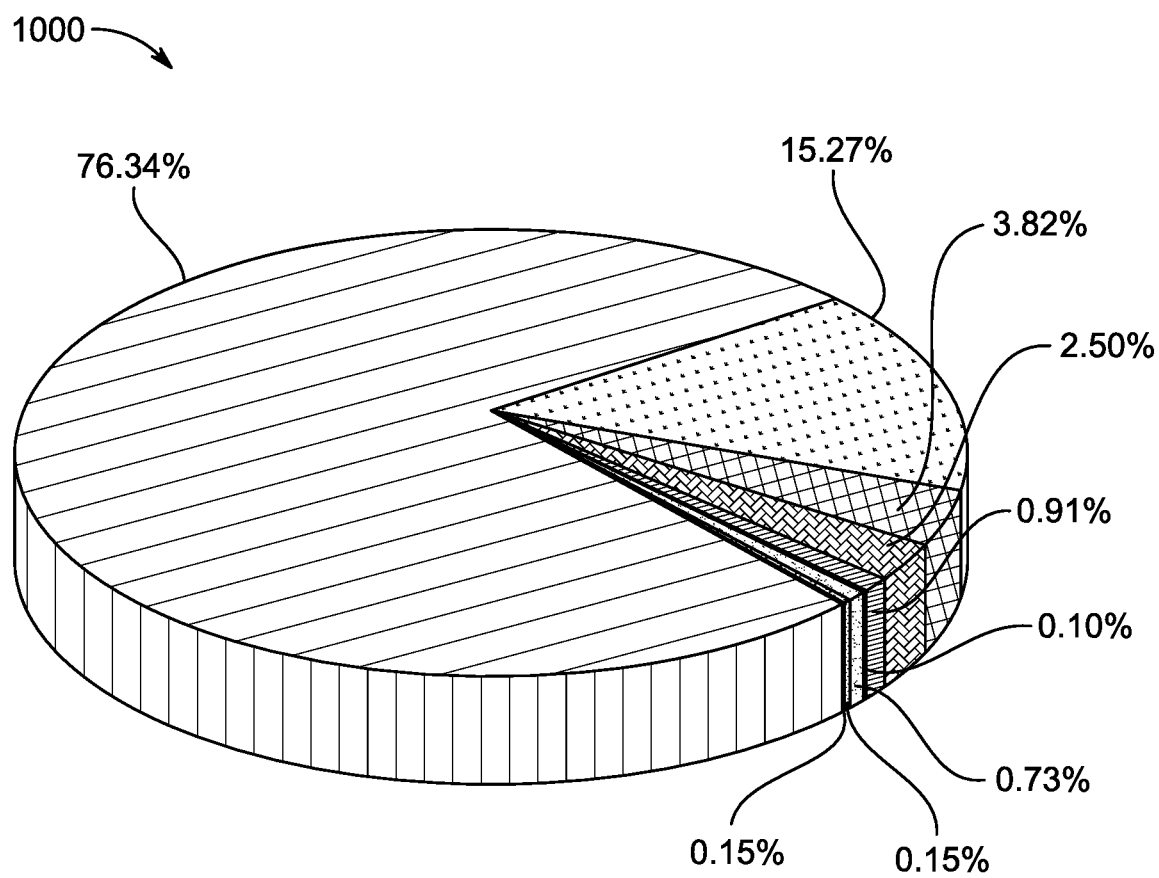
FIG. 10 is a graphical representation of energy consumption by various components of the system, according to certain embodiments of the present disclosure.

FIG. 10 illustrates a graphical representation 1000 representing energy consumption by the components of the system 100. The graphical representation 1000 shows that 76.34% of the total energy is consumed in the ED membranes 206 of the ED unit 104; 15.27% of the total energy is consumed in the diluate and concentrate channels 212, 214; 3.82% of the total energy is consumed in the boundary layers in the cell pairs 210; and 2.50% of the total energy is consumed in the RO chamber 122. Further, 0.91% of the total energy is consumed in the high-pressure pump 308; 0.73% of the total energy is consumed of by a chemical disequilibrium; 0.15% of the total energy is consumed of by the feed through the pressure exchanger 306; 0.15% of the total energy is consumed of by the brine through the pressure exchanger 306; and 0.10% in the booster pump 310. Also, 95% of the total energy is consumed in the ED unit 104 of the hybrid plant 100. Furthermore, 86% of the total product water solution production is from the ED unit 104 of the system 100.

Figure 11:
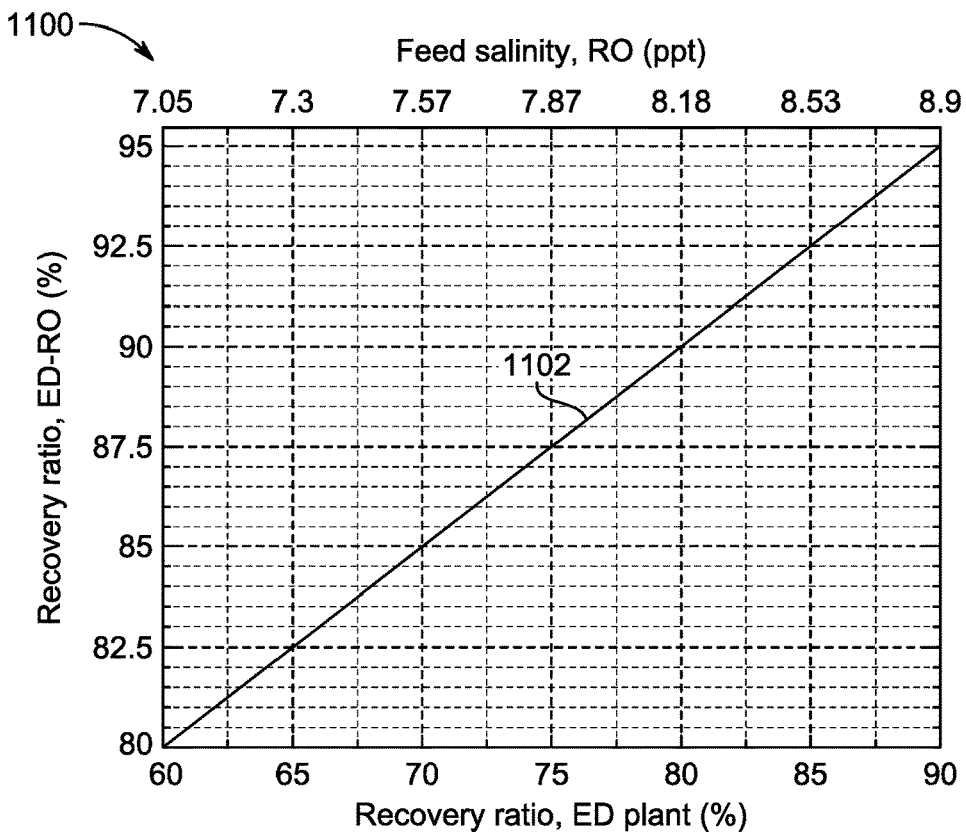
FIG. 11 is a graphical representation showing an impact of a recovery ratio of the ED unit on a net recovery ratio of the ED-RO plant, according to certain embodiments of the present disclosure.

FIG. 11 illustrates a graphical representation showing impact of the recovery ratio of the ED unit 104 ($R_{ED}$) on a net recovery ratio of the hybrid plant 100. The net recovery ratio is the ratio of the product water solution obtained from the ED unit 104 and the RO chamber 122 of the plant 100 to the feed flow rate. A graph 1100 is plotted at the ED feed salinity of 5 parts per thousand. The graph 1100 includes a plot 1102 that represents the hybrid plant 100. The net recovery ratio increases for the hybrid plant 100 when compared with the standalone ED plant. For example, the net recovery ratio for the hybrid plant 100 is 87.5% if ED and RO plants are operating at a recovery ratio of 75% and 50%, respectively, as shown in Table 6.

TABLE 6

An example for calculating the net RR of the hybrid plant 100 for an ED feed salinity of 5 ppt.

| Plant | Feed flow rate (m3/day) | Recovery ratio (%) | Product water flow rate (m3/day) | Rejected brine (m3/day) |
| --- | --- | --- | --- | --- |
| ED | 26,666 | 75% | 20,000 | 6,666 |
| RO | 6,666 | 50% | 3,333 | 3,333 |
| Hybrid | 26,666 | 87.50% | 23,333 | 3,333 |

The ED feed salinity is dependent on the source 108. However, the RO feed salinity depends on the parameters of the ED unit 104. Similarly, the recovery ratio of the ED unit 104 ($R_{ED}$) affected the feed salinity at the inlet of the RO chamber 122. For example, the feed salinity for the RO chamber 122 of the hybrid plant 100 is 7.05 parts per thousand. The ED unit 104 operates at a 60% recovery ratio and rises to 8.9 parts per thousand when the recovery ratio increases to 90%.

Figure 12:
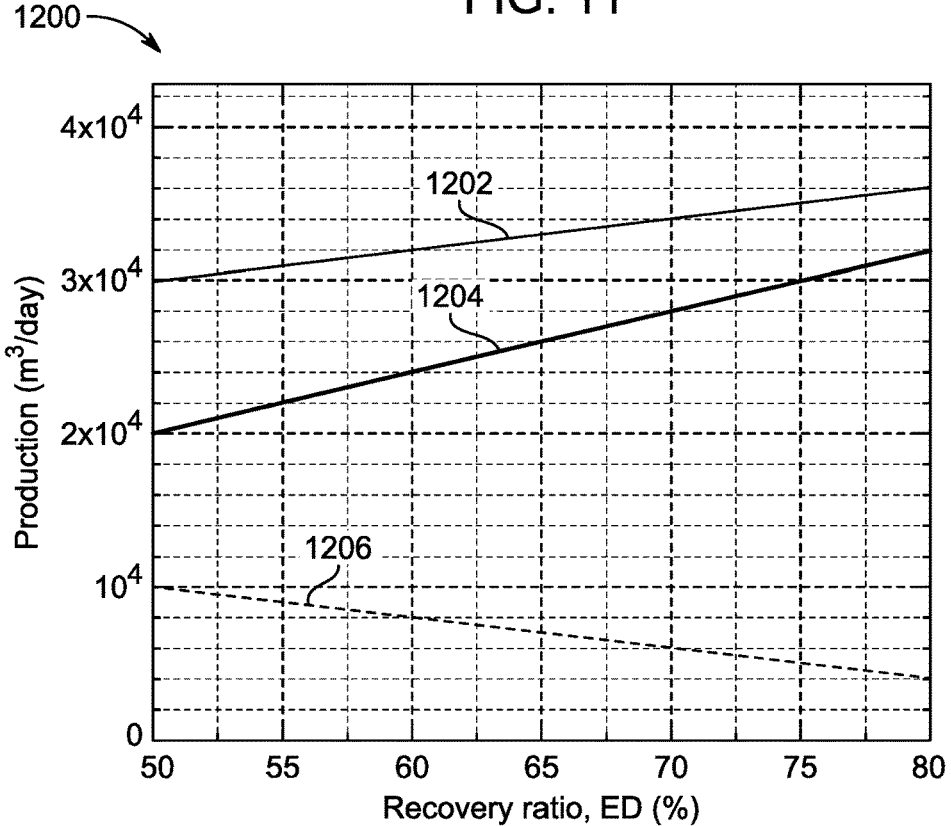
FIG. 12 is a graphical representation showing impact of the recovery ratio of the ED unit on productions by the ED unit, the RO chamber of the system, and the hybrid plant according to certain embodiments of the present disclosure.

FIG. 12 illustrates a graphical representation showing impact of the recovery ratio of the ED unit 104 ($R_{ED}$) on productions by the ED unit 104 and the RO chamber 122 of the hybrid plant 100. A graph 1200 includes a first line 1202 that represents the hybrid plant 100, a second line 1204 that represents the ED unit 104 and a third line 1206 that represents the RO chamber 122. The graph 1200 shows that the recovery ratio of the ED unit 104 ($R_{ED}$) of the hybrid plant 100 impacts a production capacity of the RO chamber 122. The second line 1204 and the third line 1206 shows 20,000 m$^3$/day and 10,000 m$^3$/day production, respectively, from the ED unit 104 and the RO chamber 122, when the ED unit 104 and the RO chamber 122 operate at 50% recovery.

The third line 1206 further shows that the RO output reduces to 4,000 m³/day when the ED unit 104 operates at a recovery ratio of 80%. Hence, the graph 1200 confirms that the production by the RO chamber 122 decreases with increase in the recovery ratio of the ED unit 104 ($R_{ED}$) of the hybrid plant 100. Furthermore, the first recovery ratio of the first diluate ($Q_{p,ED}$) being greater than a second recovery ratio of the second diluate ($Q_{p,RO}$) can be attributed to the treatment of the saline solution by the ED unit 104.

Figure 13:
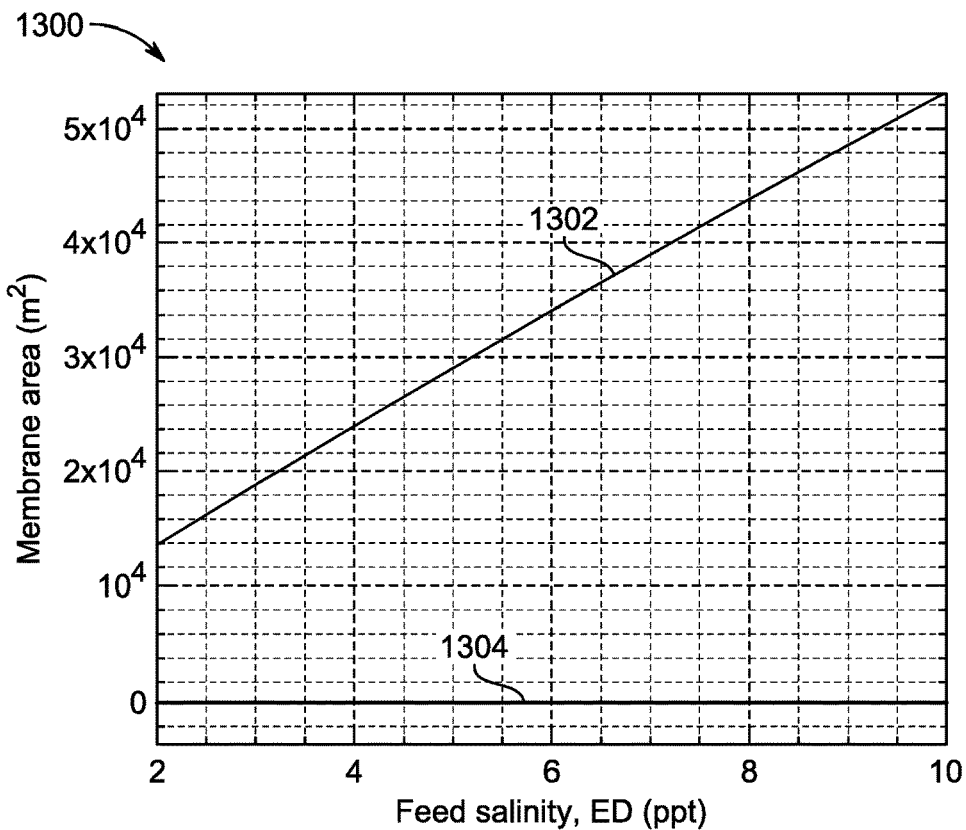
FIG. 13 is a graphical representation showing effect of a feed salinity at an inlet of a diluate stream on active membrane areas of the ED unit and the RO chamber of the system, according to certain embodiments of the present disclosure.

FIG. 13 illustrates a graphical representation showing effect of the feed salinity at the inlet of the diluate stream on active membrane areas required for the ED unit 104 and the RO chamber 122 of the hybrid plant 100 for a water production capacity of 23,333 m³/day. A graph 1300 includes a first line 1302 that represents the ED membranes 206 and a second line 1304 that represents the RO membrane 304. Table 1 and Table 3, respectively, show the input parameters for the ED unit 104 and the RO chamber 122. The first line 1302 shows that an active IEM area for the ED unit 104 increases from 13,508 to 53,101 m² when the feed salinity at the inlet of diluate stream increases from 2 to 10 parts per thousand, respectively. Similarly, for the same salinity range, the second line 1304 shows that an active RO membrane area for the RO chamber 122 increases from 78.06 m² to 102.5 m², respectively. The ED membranes, such as the CEMs 206A and the AEMs 206B, transport salt from one channel to another, while RO chamber 122 allows transport of water through RO membranes 304. The RO membranes 304 are required to withstand high pressure as the RO chamber 122 works on pressure-driven technology, for example the pressure supplied by the pumps 308 and 310. The area calculation of the membranes, either the ED membranes or the RO membranes, is required for energy, water production, and cost estimation.

Figure 14:
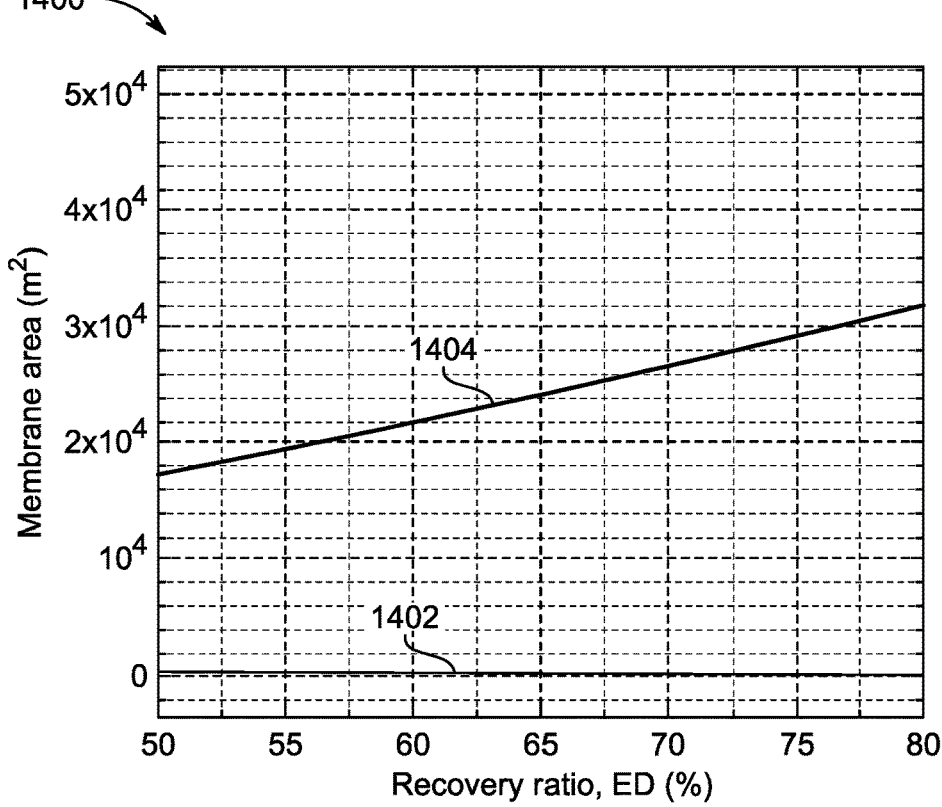
FIG. 14 is a graphical representation of the active membrane areas for the ED unit and the RO chamber against the recovery ratio of the ED unit, according to certain embodiments of the present disclosure.

FIG. 14 illustrates a graphical representation of the active membrane areas for the ED unit 104 and the RO chamber 122 against the recovery ratio of the ED unit 104 ($R_{ED}$). A graph 1400 includes a first line 1402 that represents the RO membrane 304 and a second line 1404 that represents the ED membranes 206. The first line 1402 shows that the influence of the recovery ratio of the ED unit 104 ($R_{ED}$) on the RO membrane area is substantial. The first line 1402 shows that the area of the RO membranes 304 reduces from 334.3 m² to 55.26 m². The reduced feed flow rate of the RO chamber 122 with the increased recovery ratio of the ED unit 104 ($R_{ED}$) leads to decrease in the RO membrane area. Such decrease in the RO membrane area is due to the reduced feed flow rate in the RO chamber 122 owing to an increase in the recovery ratio of the ED unit 104. The second line 1404 shows that the area of the ED membranes 206 increases from 17,263 m² to 31,728 m² on increasing the recovery ratio of the ED unit 104 ($R_{ED}$) from 50% to 80%, respectively.

Figure 15:
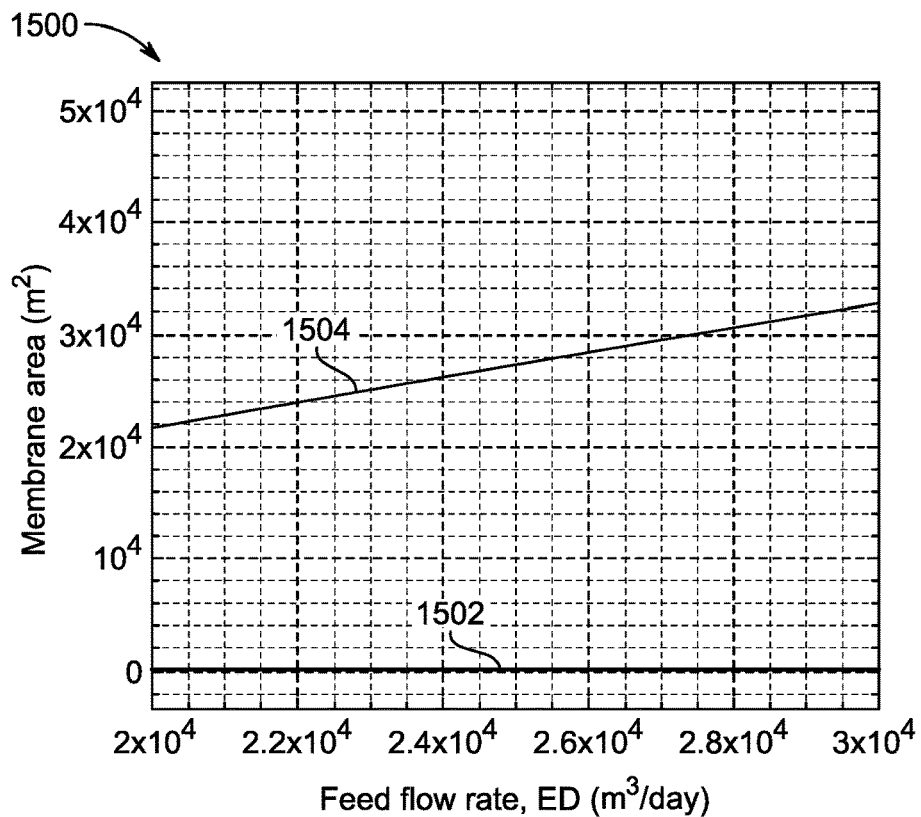
FIG. 15 is a graphical representation of the active membrane areas for the ED unit and the RO chamber against the feed flow rate at an inlet of the electrodialysis cell, according to certain embodiments.

FIG. 15 illustrates a graphical representation of the active membrane areas for the ED unit 104 and the RO chamber 122 against feed flow rate at the inlet of the electrodialysis cell 104. A graph 1500 includes a first line 1502 that represents the ED membranes 206 and a second line 1504 that represents the RO membrane 304. The first line 1502 shows that an increase in the feed flow rate at the inlet of the electrodialysis cell 104 from 20,000 m³/day to 30,000 m³/day results in an increase in the IEM areas from 21,827 m² to 32,741 m². Similarly, the same range of the feed flow rate at the inlet of the electrodialysis cell 104 results in an increase in the RO membrane area from 48.25 m² to 108.6 m², respectively. A low production capacity requirement from the RO chamber 122, i.e., 3,333 m³/day, when compared to 20,000 m³/day generated by the ED unit 104, may lead to small increase in the RO membrane area with respect to IEM areas. The membrane areas are for a recovery ratio of 75% and 50% for the ED unit 104 and the RO chamber 122 of the hybrid plant 100, respectively.

Table 7 shows cost modeling equations. Cost modeling includes, but not limited, a fixed cost, a power cost, chemicals cost, a maintenance cost, a labor cost, a membrane replacement cost/factor (MRF), and an insurance cost. The cost modeling is on annual basis (1/year).

TABLE 7

Cost modeling equations

| Meaning | Equation | Eq. No. |
|---|---|---|
| Amortization factor | $f_a = \dfrac{I_r(1 + I_r)^n}{(1 + I_r)^n - 1}$ | 25 |
| Membrane's capital cost | $k_m = A_{m,ED} \times k_{m,ED}' + A_{m,RO} \times k_{m,RO}'$ | 26 |
| Auxiliary equipment cost | $K_{eq} = 996 \times (Q_f)^{0.8}$ | 27 |
| Pumps cost | $k_p = 52 \times (\Delta P Q_f)^{0.8}$ | 28 |
| Energy recovery system, RO | $k_{ERS} = 3134.7 \times (Q_r)^{0.5}$ | 29 |
| Stacks cost, ED | $k_{st,ED} = 1.5 \times k_{m,ED}$ | 30 |
| Direct capital cost | $k_{dc} = 1.411(k_m + k_{eq} + k_p + k_{ERS} + k_{st,ED})$ | 31 |
| Fixed cost | $k_{fix} = a_f \times k_{dc}$ | 32 |
| Power cost | $k_{pw} = (k_u SEC_{tot}) y Q_p \times 365$ | 33 |
| Membrane replacement cost | $k_{mr} = MRF \times k_m$ | 34 |
| Maintenance cost | $k_{mn} = 0.02 \times k_{dc}$ | 35 |
| Chemical cost | $k_{ch} = k_{Ch}' y Q_{f,tot} \times 365$ | 36 |
| Labor cost | $k_{lb} = k_{lab}' y Q_{p,tot} \times 365$ | 37 |
| Insurance cost | $k_{is} = f_I \times k_{dc}$ | 38 |

Total capital cost of the membrane is the sum of the membrane costs of the ED membranes 206 and the RO membrane 304. The unit costs for each membrane calculates the total membrane cost. For example, the membrane costs for the ED unit 104 is 100 $/m² to 150 $/m². The cost of RO membrane element was obtained by multiplying a single permeator area by a factor of 10. The membrane capital cost helped to determine direct capital cost ($k_{dc}$). The direct capital cost depends on the membranes cost (ED and RO membranes 206, 304), stack costs, pumps cost, additional equipments cost, and energy recovery system cost. The direct capital cost ($k_{dc}$) and amortization factor ($f_a$) can calculate the fixed cost. The amortization factor ($f_a$) per year is calculated based on the interest rate ($I_r$), and the plant life (n). Membrane replacement factor (MRF) was calculated based on the total membrane cost (either ED or RO membrane 206, 304) and the MRF for the RO chamber 122 was considered in the range of 5% to 20%. However, the MRF was considered to be 5% for the ED membrane 206 as the ED membrane 206 is limited to low-pressure applications, unlike RO membranes 304. Insurance cost was considered to be 0.5% of the direct capital cost ($k_{dc}$), and maintenance cost was 2% of the direct capital cost of the hybrid plant 100. The present disclosure used a plant availability factor (y) of 0.9 that implies 328 working days. The product water cost (in $/m³) for the hybrid plant 100 was calculated based on the above-described cost elements by equation (39).

$$k_{pc} = \frac{k_{fix} + k_{pw} + k_{ch} + k_{mr} + k_{lb} + k_{mn} + k_{in}}{y \times Q_{p,tot} \times 365} \quad (39)$$

where $k_{pc}$, is the permeate cost in $/m³, $k_{fix}$ is the fixed cost of the ED unit 104 and the RO chamber 122, $k_{ch}$ is an annual chemical cost, $k_{pw}$ is the power cost, $k_{lb}$ is the labor cost, $k_{mr}$ is the cost of membrane replacement for the ED and RO membranes 206, 304, $k_{in}$ is the insurance cost, and $k_{mn}$ is the yearly maintenance cost. $Q_{p,tot}$ is the net product water flow rate.

TABLE 8

Input parameters for the cost model

| Parameters | Symbols | Values |
| --- | --- | --- |
| Plant life expectancy | n | 30 years |
| Power cost | $k_u$ | 0.12 $/m³ |
| Labor cost | $k'_{lb}$ | 0.05 $/m³ |
| Interest rate | $I_r$ | 5% |
| Chemical cost | $k'_{Ch}$ | 0.04 $/m³ |
| Insurance factor | $f_I$ | 0.50% |
| Plant availability factor | Y | 0.9 |

Figure 16:
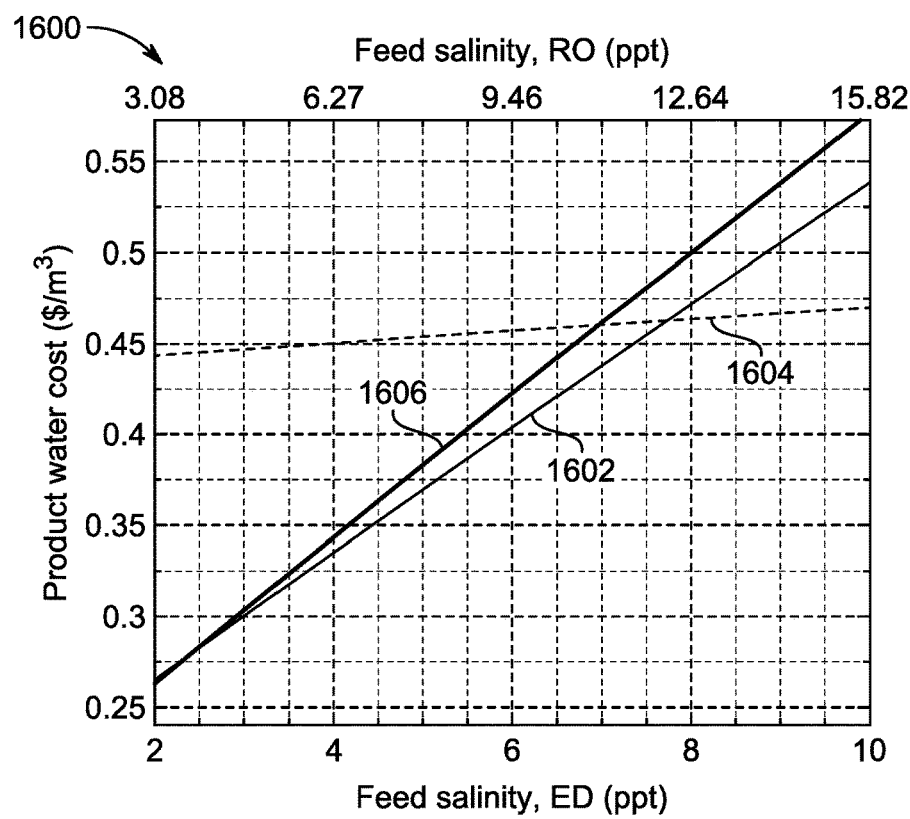
FIG. 16 is a graphical representation comparing product water cost for the system with the standalone ED and RO plants, according to certain embodiments.

FIG. 16 illustrates a graphical representation comparing the permeate cost for the hybrid plant 100 with standalone ED and RO plants. A graph 1600 includes a first line 1602 that represents the hybrid plant 100, a second line 1604 that represents the RO plant and a third line 1606 that represents the ED plant. The graph 1600 corresponds to the permeate concentration of 0.2 parts per thousand, while feed salinity is increased from 2 parts per thousand to 10 parts per thousand for the production capacity of 23,333 m³/day. The graph 1600 showed that the hybrid plant 100 is economically efficient for the feed salinity of 2.5-7.8 parts per thousand. For example, at the feed salinity of 5 parts per thousand, the cost of permeate is 0.37 $/m³ for hybrid plant 100, 0.3839 $/m³ for standalone ED plant, and 0.4534 $/m³ for the standalone RO plant. Further, at the feed salinity of 7 parts per thousand, the hybrid plant 100 and the standalone ED and RO show cost of 0.4378, 0.460 and 0.4614 $/m³, respectively. Furthermore, at the feed salinity of more than 7.8 parts per thousand (for example, 10 parts per thousand), product water cost rises to 0.5384 $/m³ for hybrid plant 100, 0.576 $/m³ for the standalone ED plant, and 0.4696 $/m³ for the standalone RO plant. Higher water production than the standalone ED and RO plants leads to lower product water cost for the hybrid plant 100.

Figure 17:
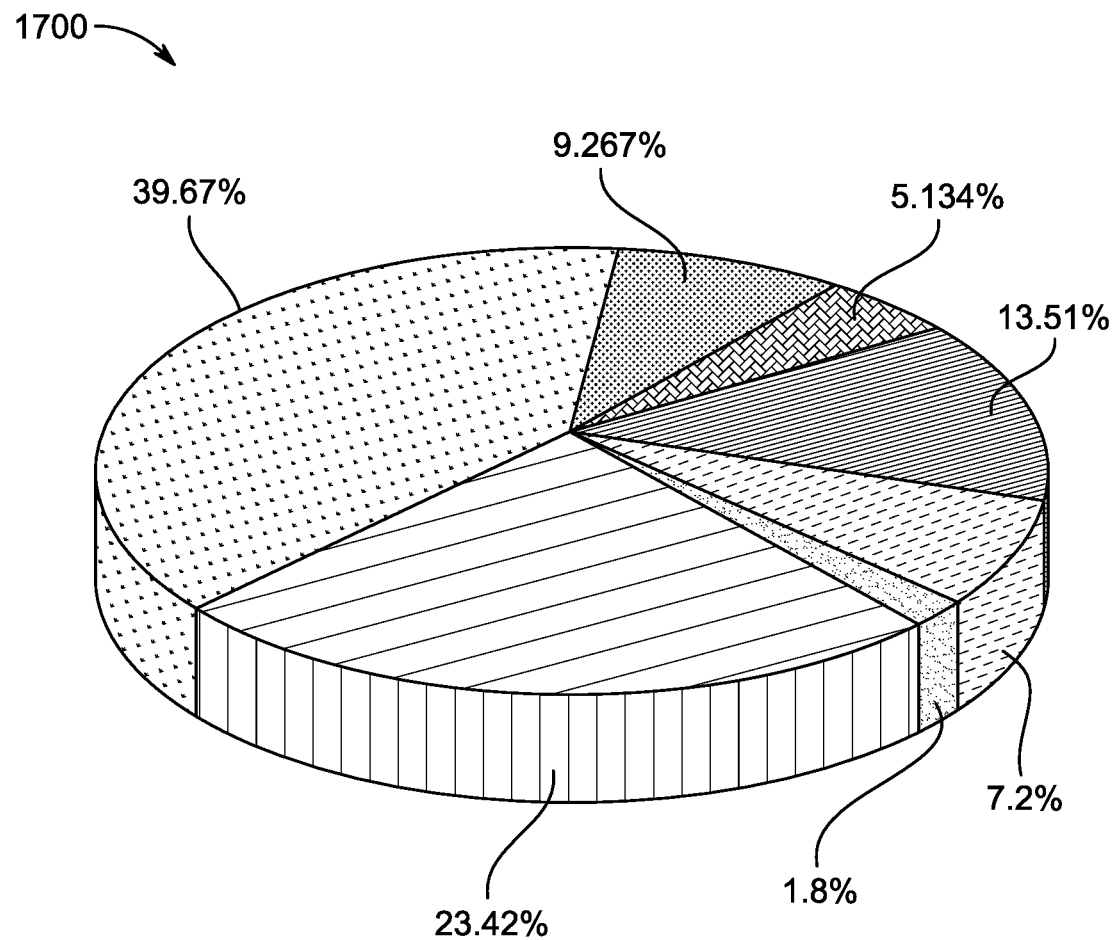
FIG. 17 is a graphical representation of cost contributors towards product water cost produced at a feed salinity of 5 parts per thousand (ppt), according to certain embodiments.

FIG. 17 illustrates a graphical representation 1700 of cost contributors for the feed salinity of 5 parts per thousand. The graphical representation 1700 shows that the power cost was 39.67%, fixed cost was 23.42%, labor cost was 13.51%, chemical cost was 9.267%, maintenance cost was 7.2%, membrane replacement cost was 5.13%, and insurance cost was 1.8%. Hence, the graph confirms that the power and fixed costs are essential factors for determining the product water cost.

Obviously, numerous modifications and variations of the present disclosure are possible in light of the above teachings. It is therefore to be understood that within the scope of the appended claims, the present disclosure may be deduced to practice otherwise than as specifically described herein.

The invention claimed is:

1. A method for desalination, comprising:
applying an electric potential difference across a saline solution in an electrodialysis cell having a positive anode and a negative cathode, wherein a salinity of the saline solution is between 2.5 parts per thousand and 7.8 parts per thousand;
separating, by electrodialysis in the electrodialysis cell, the saline solution into a concentrated saline solution and a first diluate;
transferring the concentrated saline solution to a reverse osmosis (RO) chamber connected to the electrodialysis cell, wherein the RO chamber includes at least one pump and at least one partially permeable membrane;
pumping, with the at least one pump, the concentrated saline solution through the at least one partially permeable membrane, thereby removing salt ions from the concentrated saline solution and creating a second diluate and a brine solution;
increasing a pressure of the concentrated saline solution by transferring, with a pressure exchanger, water pressure from the brine solution to the concentrated saline solution; and
combining the first diluate and the second diluate into a product water solution;
wherein a first recovery ratio of the first diluate is greater than a second recovery ratio of the second diluate.

2. The method of claim 1, further comprising filtering the saline solution with at least one pretreatment filter before applying the electric potential difference.

3. The method of claim 2, wherein the at least one pretreatment filter is one of a sand filter, a cartridge filter, or a chemical filter.

4. The method of claim 1, wherein the electrodialysis cell comprises a plurality of cation exchange membranes (CEMs) and a plurality of anion exchange membranes (AEMs).

5. The method of claim 1, further comprising increasing a pressure of the concentrated saline solution after separation in the electrodialysis cell with at least one high pressure pump.

6. The method of claim 1, further comprising increasing a pressure of the concentrated saline solution after the pressure exchanger using at least one booster pump.

7. The method of claim 1, further comprising crystallizing the brine solution, resulting in a salt precipitate and a third diluate, the third diluate having a lower concentration of dissolved salts than the brine solution.

8. The method of claim 1, further comprising adjusting a mineral content of the product water solution.

9. The method of claim 1, further comprising filtering the product water solution.

10. The method of claim 1, further comprising adjusting a pH of the product water solution.

* * * * *